(12) United States Patent
Lee et al.

(10) Patent No.: US 8,008,890 B2
(45) Date of Patent: Aug. 30, 2011

(54) CHARGE EQUALIZATION APPARATUS

(75) Inventors: Joong Hui Lee, Daejeon (KR); Soo Yeup Jang, Daejeon (KR); Jeon Keun Oh, Daejeon (KR); Gun Woo Moon, Daejeon (KR); Chong Eun Kim, Daejeon (KR); Hong Sun Park, Daejeon (KR); Chol Ho Kim, Daejeon (KR)

(73) Assignees: SK Energy Co., Ltd., Seoul (KR); Korea Advanced Institute of Science and Technology, Daejon (KR)

( * ) Notice: Subject to any disclaimer, the term of this patent is extended or adjusted under 35 U.S.C. 154(b) by 238 days.

(21) Appl. No.: 12/449,312

(22) PCT Filed: Feb. 5, 2008

(86) PCT No.: PCT/KR2008/000737
§ 371 (c)(1),
(2), (4) Date: Jul. 31, 2009

(87) PCT Pub. No.: WO2008/097031
PCT Pub. Date: Aug. 14, 2008

(65) Prior Publication Data
US 2010/0007308 A1 Jan. 14, 2010

(30) Foreign Application Priority Data
Feb. 9, 2007 (KR) .................. 10-2007-0013892

(51) Int. Cl.
*H02J 7/00* (2006.01)

(52) U.S. Cl. ............. 320/118; 320/119; 320/122
(58) Field of Classification Search .............. None
See application file for complete search history.

(56) References Cited

U.S. PATENT DOCUMENTS

| 4,079,303 | A  | * | 3/1978  | Cox ............... 320/119 |
| 5,594,320 | A  |   | 1/1997  | Pacholok et al. |
| 6,100,663 | A  | * | 8/2000  | Boys et al. ............ 320/108 |
| 6,297,616 | B1 |   | 10/2001 | Kubo et al. |
| 6,373,223 | B1 | * | 4/2002  | Anzawa et al. ........ 320/118 |
| 6,538,414 | B1 |   | 3/2003  | Tsuruga et al. |
| 6,670,789 | B2 | * | 12/2003 | Anzawa et al. ........ 320/118 |
| 6,791,297 | B2 | * | 9/2004  | Ott et al. .............. 320/116 |
| 7,061,207 | B2 | * | 6/2006  | Patel et al. ........... 320/119 |

FOREIGN PATENT DOCUMENTS
KR 20000010733 2/2000
KR 20010006576 1/2001

OTHER PUBLICATIONS

International Search Report mailed on May 23, 2008 by the Korean Intellectual Patent Office in counterpart foreign application No. PCT/KR2008/000735.

* cited by examiner

*Primary Examiner* — Edward Tso
*Assistant Examiner* — Ramy Ramadan
(74) *Attorney, Agent, or Firm* — Abelman, Frayne & Frayne

(57) ABSTRACT

The present invention relates to a charge equalization apparatus, which can enable the primary windings and the secondary windings of transformers to be easily manufactured, can control the flow of charges into batteries depending on the charged states of series-connected batteries, and can prevent overcurrent from flowing into batteries that are currently being charged.

21 Claims, 11 Drawing Sheets

CHARGE EQUALIZATION APPARATUS

TECHNICAL FIELD

The present invention relates, in general, to a battery charge equalization apparatus, and, more particularly, to a charge equalization apparatus, which can enable the primary winding and the secondary winding of a transformer to be easily manufactured, can control the flow of charges into batteries depending on the charged states of series-connected batteries, and can prevent overcurrent from flowing into batteries that are currently being charged.

BACKGROUND ART

A plurality of systems uses a battery implemented as a battery pack or battery array, including a plurality of battery cells connected in series with each other.

When such a battery cell is charged to a much higher voltage or a much lower voltage than the voltage within a rated charge range, it may be dangerous.

Further, imbalance in the charged state of battery cells is caused by various factors, and occurs during the manufacture of batteries or the charge or discharge of batteries. In particular, in the case of lithium ion cells, the manufacture of cells is strictly controlled within a company to minimize the differences between the capacities of the cells of a battery array. However, imbalance or inequality between cells may occur due to various factors, regardless of the states of the cells, in which balance or equality is maintained after the cells are initially manufactured.

The factors influencing the imbalance of cells may include, for example, the chemical reactions, impedances and self-discharge rates of respective cells, reduction of the capacities of the cells, variation in the operating temperatures of the cells, and other types of variation between the cells.

Inconsistency in the temperature of cells is an important factor responsible for causing imbalance in cells. For example, "self-discharge" is caused in a battery cell, and is a function of a battery temperature. A battery having a high temperature typically has a self-discharge rate higher than that of a battery having a low temperature. As a result, the battery having a high temperature exhibits a lower charged state than the battery having a low temperature, with the passage of time.

Imbalance is a very series problem in the charged state of a battery. For example, this problem may typically occur in electric vehicles, and the capability of a battery to supply energy is limited by the battery cell having the lowest charged state.

If this battery cell is consumed, other battery cells lose the ability to continue to supply energy. This is the same even if the other battery cells still have the ability to supply power. Therefore, an imbalance in the charged state of battery cells reduces the power supply capability of the battery.

Of course, the above description does not mean that when one or more battery cells are consumed the supply of power by the remaining battery cells is completely impossible. However, it means that, only in the case of series connection, even if one or more battery cells are fully consumed, the battery can be continuously used as long as charge remains in the remaining battery cells, but, in that case, voltage having a reversed polarity is generated in the battery cell which has been fully discharged, and, as a result, the battery cell may be in danger of explosion due to the overheating thereof, or due to the generation of gas, and thus the battery loses power supply capability.

Various methods of correcting imbalance in the charged states of battery cells have been proposed, and one of the methods is shown in FIG. 1.

FIG. 1 is a diagram showing a conventional centralized charge equalization apparatus.

Referring to FIG. 1, the conventional centralized charge equalization apparatus includes a transformer T, N semiconductor switching devices D1 to Dn, a control switch SW, and a voltage detection and drive signal generation unit 10.

The transformer T is constructed such that it includes a single primary winding and N secondary windings, the N secondary windings are wound around a single common core, and the primary winding and the secondary windings have different polarities. In other words, a dot formed on the primary winding and dots formed on the secondary windings are placed on different sides. The secondary windings of the transformer T have the same number of turns, and the turns ratio of the primary winding to the secondary windings is N1:N2.

The semiconductor switching devices D1 to Dn are connected between the first ends of the secondary windings and the cathodes (+) of the batteries B1 to Bn, and are configured to rectify energy that is supplied from the secondary windings to the batteries B1 to Bn.

The control switch SW is connected in series with the primary winding, and is configured to form a closed loop in response to a drive signal provided by the voltage detection and drive signal generation unit 10.

The voltage detection and drive signal generation unit 10 detects the voltages of respective series-connected batteries B1 to Bn, compares the detected voltages with a reference voltage, and generates a drive signal required to discharge batteries charged to voltages greater than the reference voltage, that is, overcharged batteries.

A charge equalization method performed by such a conventional centralized charge equalization apparatus is described below.

First, the voltage detection and drive signal generation unit 10 detects the voltages of N series-connected batteries B1 to Bn.

Thereafter, the voltage detection and drive signal generation unit 10 turns on the control switch SW when the voltage detected from any one of the N series-connected batteries B1 to Bn is greater than the reference voltage.

Accordingly, energy supplied by the N series-connected batteries B1 to Bn is converted into magnetic energy and is stored in the primary winding of the transformer T.

Thereafter, when the voltage detection and drive signal generation unit 10 turns off the control switch SW, the magnetic energy, stored in the primary winding of the transformer T, is converted into a charge, and thus the N series-connected batteries B1 to Bn are charged with the charge through the secondary windings and the semiconductor switching devices D1 to Dn.

In this case, when the control switch SW is turned off, a greater amount of charge moves to a battery having a relatively low voltage through the secondary windings wound around the common core of the transformer T, thus realizing charge equalization.

However, in the conventional centralized charge equalization apparatus, since a number of secondary windings corresponding to the number of batteries is wound around a single common core, an increasing number of secondary windings corresponding to the increasing number of batteries must be wound around the single common core when the number of series-connected batteries increases. Accordingly, there are problems in that it is difficult to manufacture the secondary windings of the transformer T, and the turns ratio of the primary winding to the secondary windings of the transformer T increases in proportion to the number of series-connected batteries, thus making it difficult to manufacture the primary winding as the number of batteries increases.

Further, the conventional centralized charge equalization apparatus is problematic in that, since a number of secondary windings corresponding to the number of batteries is wound around a single common core, the flow of charge into batteries cannot be individually controlled depending on the charged states of the series-connected batteries, and overcurrent cannot be prevented from flowing into batteries that are currently being charged.

Accordingly, there is a problem in that some batteries may be overcharged or overdischarged when the charge equalization of series-connected batteries is performed.

DISCLOSURE

Technical Problem

Accordingly, the present invention has been made keeping in mind the above problems occurring in the prior art, and the present invention is intended to provide a charge equalization apparatus, which can enable the primary windings and the secondary windings of transformers to be easily manufactured.

Further, the present invention is intended to provide a charge equalization apparatus, which can control the flow of charges into batteries depending on the charged states of series-connected batteries.

Furthermore, the present invention is intended to provide a charge equalization apparatus, which can prevent overcurrent from flowing into batteries that are currently being charged.

Technical Solution

In accordance with an aspect of the present invention, there is provided a charge equalization apparatus, comprising N transformers respectively connected in parallel with N series-connected batteries, and configured to store energy, discharged from overcharged batteries, among the N batteries, and to charge batteries other than the overcharged batteries with the stored energy; N charge/discharge control switching units respectively connected between first ends of primary windings of the N transformers and an anode of a first battery of the N batteries so as to supply a charge, supplied by the N series-connected batteries, to the primary windings of the N transformers; a redistribution switch connected between a common node of second ends of the primary windings of the N transformers and a ground so as to supply the charge, supplied by the N series-connected batteries, to the primary windings of the N transformers; N first semiconductor switching devices respectively connected between first ends of secondary windings of the N transformers and anodes of the batteries; and a voltage detection and drive signal generation unit configured to detect voltages of respective N series-connected batteries, to generate a drive signal, required to drive the charge/discharge control switching units and the redistribution switch, depending on detected voltages, and to control driving of the charge/discharge control switching units and the redistribution switch.

In accordance with another aspect of the present invention, there is provided a charge equalization apparatus, comprising N transformers, each having a single primary winding and two secondary windings, the N transformers being respectively connected in parallel with N series-connected batteries so as to charge batteries other than overcharged batteries with energy discharged from the overcharged batteries; first and second charging devices connected in parallel with the N series-connected batteries; first and second redistribution switches connected in parallel with the N series-connected batteries, and configured to supply a charge, supplied by the N series-connected batteries, to primary windings of the N transformers; N charge/discharge control switching units connected between a common node of the first and second redistribution switches and first ends of the primary windings of the transformers so as to supply the charge, supplied by the N series-connected batteries, to the primary windings of the N transformers; N first semiconductor switching devices respectively connected between first secondary windings of the N transformers and anodes of the batteries; N second semiconductor switching devices respectively connected between second secondary windings of the N transformers and the anodes of the batteries; and a voltage detection and drive signal generation unit configured to detect voltages of respective N series-connected batteries, to generate a drive signal, required to drive the charge/discharge control switching units and the redistribution switches, depending on detected voltages and to control driving of the charge/discharge control switching units and the redistribution switches.

Advantageous Effects

Accordingly, the present invention is advantageous in that small-capacity transformers are connected in parallel with respective series-connected batteries regardless of the number of series-connected batteries, thus enabling the primary windings and the secondary windings of transformers to be easily manufactured while maintaining excellent charge equalization characteristics.

Further, the present invention is advantageous in that the flow of charges into batteries can be controlled depending on the charged states of series-connected batteries through the use of charge/discharge control switches connected in series with the primary windings of transformers.

Furthermore, the present invention is advantageous in that the flow of charges into batteries can be controlled depending on the charged states of N series-connected batteries through the use of redistribution switches connected in parallel with the N series-connected batteries.

Further, the present invention is advantageous in that, if overcurrent flows into a small number of arbitrary batteries when the charge equalization of batteries is almost completed, or when almost all charge/discharge control switches are turned on, the PWM duty ratio of a drive signal applied to the redistribution switches is controlled, thus preventing overcurrent from flowing into batteries that are currently being charged.

Figure 1:
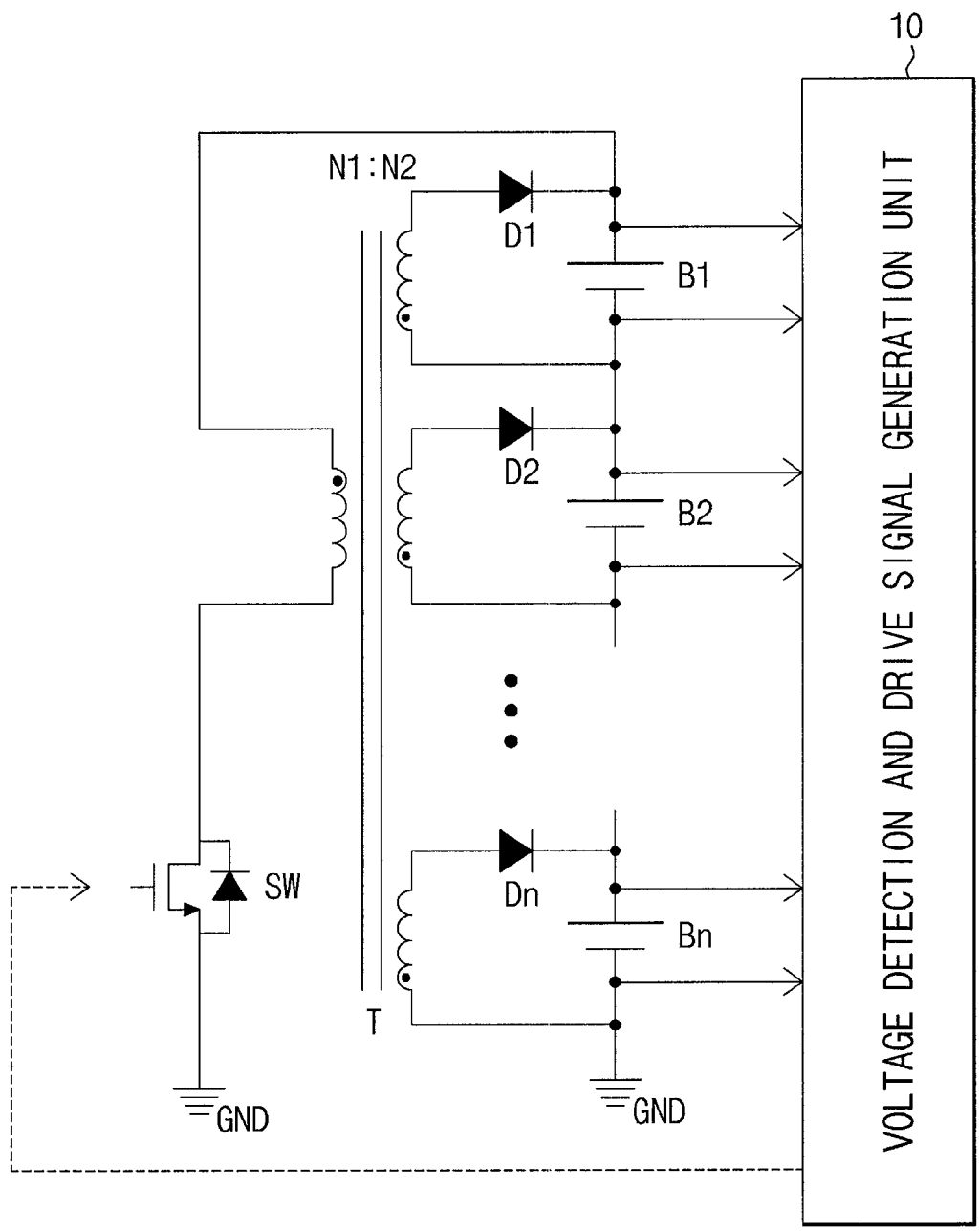
FIG. 1 is a diagram showing a conventional charge equalization apparatus.

DESCRIPTION OF REFERENCE CHARACTERS
OF IMPORTANT PARTS

10, 100: voltage detection and drive signal generation unit
102: sensing unit 104: microprocessor
106: switch driving circuit unit

MODE FOR INVENTION

Hereinafter, embodiments of the present invention will be described in detail with reference to the attached drawings.

Figure 2:
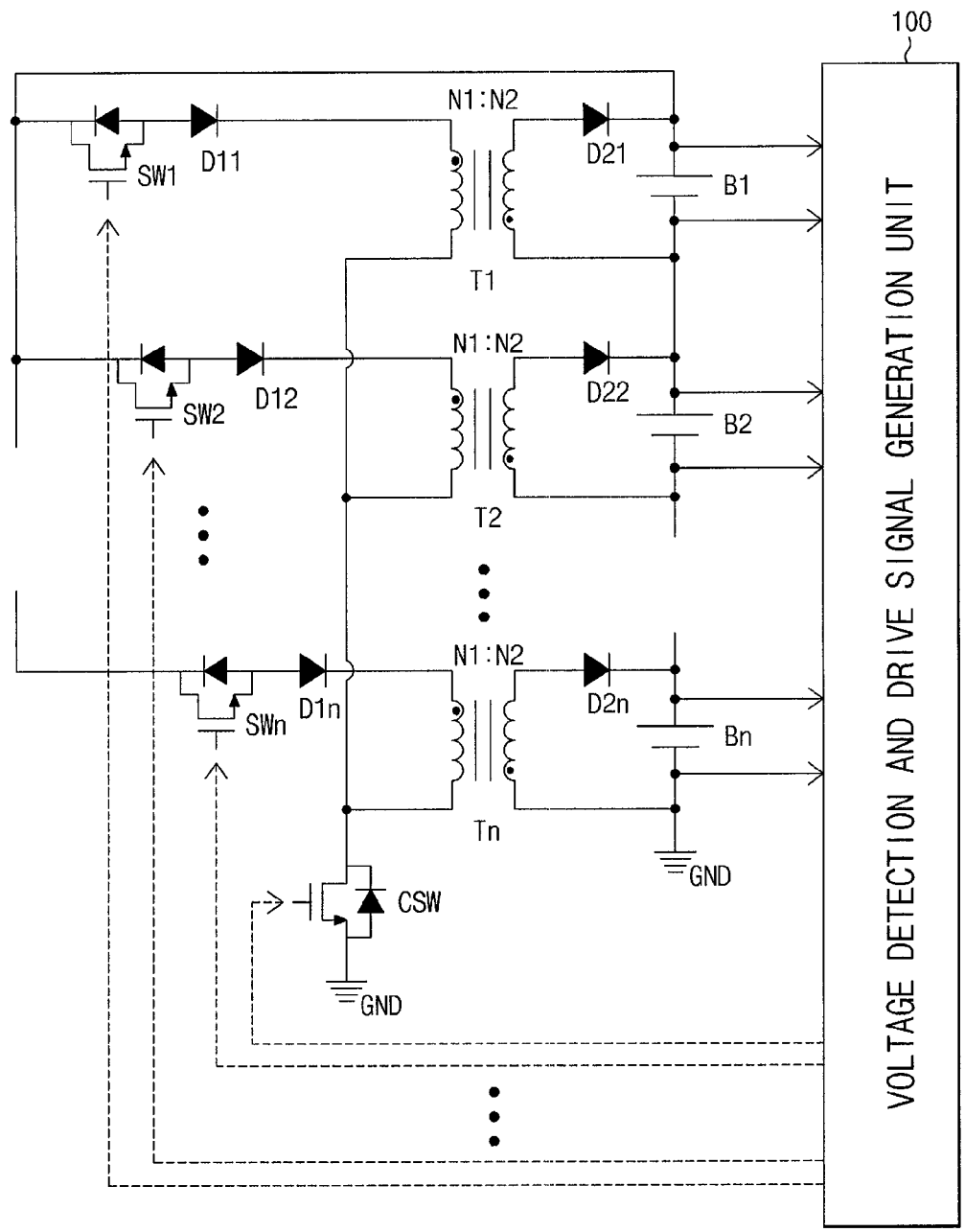
FIG. 2 is a diagram showing a charge equalization apparatus according to an embodiment of the present invention.
Figure 3:
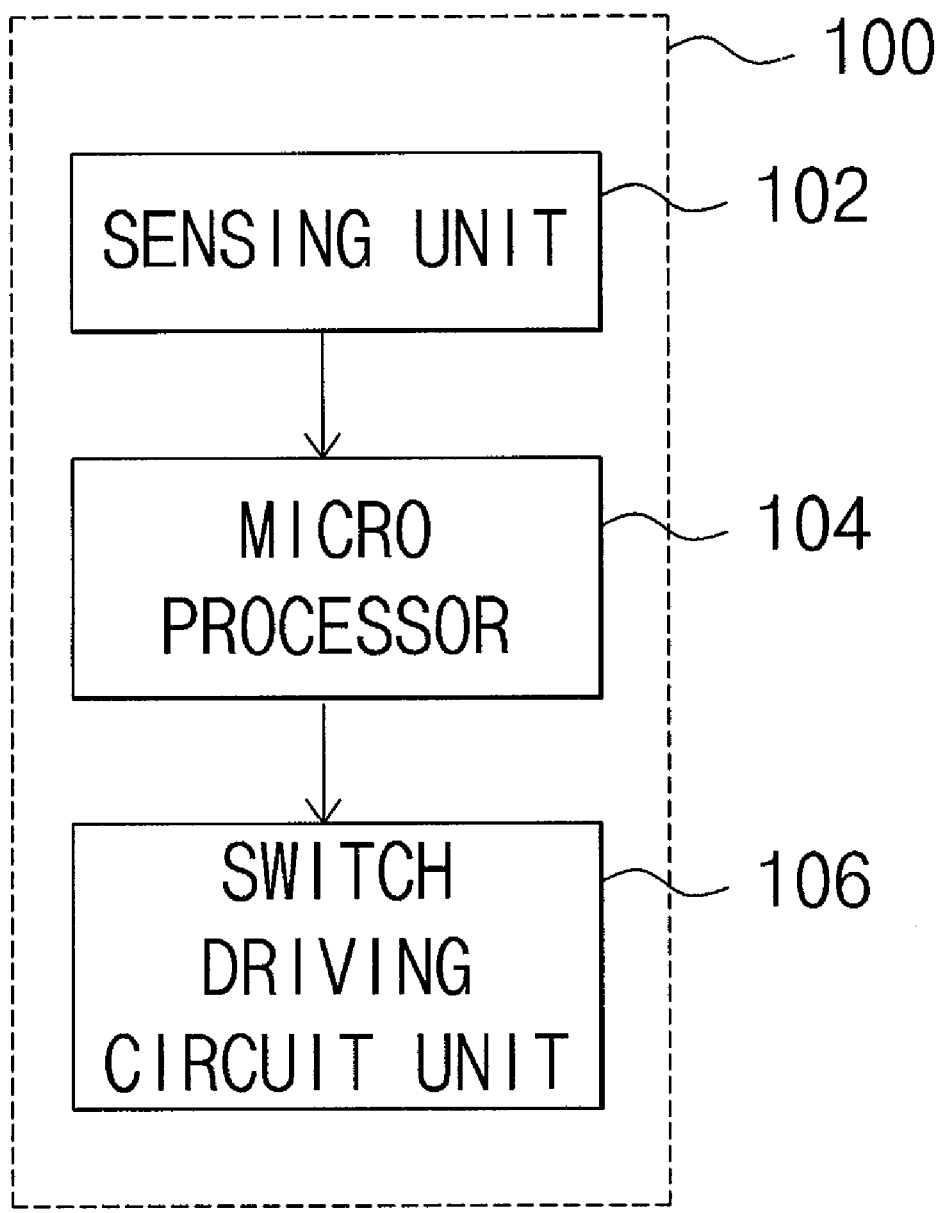
FIG. 3 is a diagram showing the voltage detection and drive signal generation unit of FIG. 2.

FIG. 2 is a diagram showing a charge equalization apparatus according to an embodiment of the present invention, and FIG. 3 is a diagram showing the voltage detection and drive signal generation unit 100 of FIG. 2.

Referring to FIGS. 2 and 3, a charge equalization apparatus according to an embodiment of the present invention includes N transformers T1 to Tn, which are respectively connected in parallel with N series-connected batteries B1 to Bn, N charge/discharge control switches SW1 to SWn and N first semiconductor switching devices D11 to D1n, which are respectively connected in series between the first ends of the primary windings of the N transformers T1 to Tn and the cathode (+) of the first battery B1 of the N series-connected batteries B1 to Bn, N second semiconductor switching devices D21 to D2n, which are respectively connected in series between the first ends of the secondary windings of the N transformers T1 to Tn and the anodes of the batteries B1 to Bn, a redistribution switch CSW, which is connected between the common node of the second ends of the primary windings of the transformers T1 to Tn and the ground (GND), and a voltage detection and drive signal generation unit 100, which detects the voltages of the batteries B1 to Bn and controls the operation of the charge/discharge control switches SW1 to SWn and the redistribution switch CSW using the detected voltages.

The transformers T1 to Tn are respectively connected in parallel with the N series-connected batteries B1 to Bn so as to decrease the voltages of batteries having voltages greater than a reference voltage, that is, overcharged batteries, among the N series-connected batteries B1 to Bn, to the reference voltage, and to increase the voltages of batteries having voltages less than the reference voltage, that is, overdischarged batteries, to the reference voltage.

The first ends (terminals on which dots are formed) of the primary windings of the transformers T1 to Tn are connected in common to the cathode (+) of the first battery B1 of the series-connected batteries through the charge/discharge control switches SW1 to SWn and the first semiconductor switching devices D11 to D1n, and the second ends thereof (terminals on which dots are not formed) are connected in common to the first end of the redistribution switch CSW.

Further, the first ends (terminals on which dots are not formed) of the secondary windings of the transformers T1 to Tn are connected to the cathodes (+) of the batteries B1 to Bn through the second semiconductor switching devices D21 to D2n, and the second ends thereof (terminals on which dots are formed) are respectively connected to the anodes (−) of the batteries B1 to Bn.

In this case, the transformers T1 to Tn are each implemented using a flyback structure, in which a primary winding and a secondary winding have opposite polarities, that is, in which a dot formed on a primary winding and a dot formed on a secondary winding are placed on different sides. In each of the transformers T1 to Tn, the turns ratio of the primary winding to the secondary winding is N1:N2, where N1 is greater than N2.

In this embodiment, each of the transformers T1 to Tn is implemented using a flyback structure in which the dots formed on the primary winding and the secondary winding are placed on different sides, but may be implemented using a forward structure in which dots formed on the primary winding and the secondary winding are placed on the same side, that is, in which the primary winding and the secondary winding have the same polarity.

The charge/discharge control switches SW1 to SWn are connected between the cathode (+) of the battery B1 and the anodes of the first semiconductor switching devices D11 to D1n and are configured such that they are turned on in response to a high-level first drive signal, provided by the voltage detection and drive signal generation unit 100, and supply energy, discharged from overcharged batteries, among the N series-connected batteries B1 to Bn, to the primary windings of transformers, which are connected in parallel with the batteries other than the overcharged batteries, and such that they are turned off in response to a low-level second drive signal, provided by the voltage detection and drive signal generation unit 100, and prevent current from flowing into the primary windings of transformers, which are connected in parallel with the overcharged batteries.

For this purpose, the charge/discharge control switches, connected in parallel with the overcharged batteries, receive the low-level second drive signal from the voltage detection and drive signal generation unit 100. The charge/discharge control switches, connected in parallel with the batteries other than the overcharged batteries, receive the high-level first drive signal.

Accordingly, current flows through the primary windings of the transformers, connected in parallel with the batteries other than overcharged batteries, whereas current does not flow through the primary windings of the transformers, connected in parallel with the overcharged batteries because current is blocked by the charge/discharge control switches.

The charge/discharge control switches SW1 to SWn are turned on or off at different times depending on the voltages detected from overdischarged batteries among the series-connected batteries B1 to Bn.

In other words, when, of the series-connected batteries B1 to Bn, the first battery B1 and the third battery B3 are overdischarged, the charge/discharge control switches SW1 to SWn are operated such that more energy is supplied to the primary winding of a transformer connected in parallel with one of the two batteries having a lower voltage value.

That is, of the two batteries, the battery having the lower voltage is provided with a high-level drive signal that is maintained for a longer time so that the battery is charged for a longer time, and the battery having the higher voltage is provided with a high-level drive signal that is maintained for a shorter time so that the battery is charged for a shorter time. As a result, the voltages of the two overdischarged batteries are equalized to the reference voltage.

For this purpose, the charge/discharge control switches SW1 to SWn receive the first drive signal and the second drive signal, which have different or identical times, from the voltage detection and drive signal generation unit 100.

The charge/discharge control switches SW1 to SWn are implemented using N-type Metal Oxide Semiconductor Field Effect Transistors (MOSFETs), but are not limited to N-type MOSFETs, and may be implemented using one of switching devices, such as P-type MOSFETs, Bipolar Junction Transistors (BJTs), diodes, and relays.

The first semiconductor switching devices D11 to D1$n$ are connected between the first ends of the primary windings of the transformers T1 to Tn and the charge/discharge control switches SW1 to SWn and are operated to supply energy, supplied by the N series-connected batteries B1 to Bn, to the primary windings of the transformers T1 to Tn.

Further, the first semiconductor switching devices D11 to D1$n$ prevent energy, stored in the primary windings of the transformers T1 to Tn, from being supplied to the series-connected batteries B1 to Bn when a charge supplied by the series-connected batteries B1 to Bn is supplied to the primary windings of the transformers T1 to Tn.

The first semiconductor switching devices D11 to D1$n$ are connected between the charge/discharge control switches SW1 to SWn and the primary windings of the transformers T1 to Tn, but may alternatively be connected between the cathode (+) of the first battery B1 of the series-connected batteries B1 to Bn and the charge/discharge control switches SW1 to SWn.

In other words, the locations of the charge/discharge control switches SW1 to SWn and the first semiconductor switching devices D11 to D1$n$ can be exchanged with each other.

In this embodiment, the first semiconductor switching devices D11 to D1$n$ are implemented using diodes, but may be implemented using one of switching devices, such as MOSFETs, BJTs, and relays.

Since the charge/discharge control switches SW1 to SWn and the first semiconductor switching devices D11 to D1$n$ form a charge/discharge path when the N series-connected batteries B1 to Bn are charged or discharged, and prevent a charge supplied by the primary windings of the transformers T1 to Tn from being supplied to the N series-connected batteries B1 to Bn, they can be designated as charge/discharge control switching units.

In this case, the charge/discharge control switching units operate in only one direction because they prevent the charge supplied by the primary windings of the transformers T1 to Tn from being supplied to the N series-connected batteries B1 to Bn through the use of the first semiconductor switching devices D11 to D1$n$.

However, when the charge/discharge control switches and the first semiconductor switching devices of the charge/discharge control switching units are implemented using the same type of MOSFET, and the internal diodes thereof are arranged in opposite directions, the charge/discharge control switching units may be bidirectionally operated. In this case, the same drive signal must be provided to the gates of the charge/discharge control switches and the first semiconductor switching devices. This will be described in detail later with reference to FIG. 9, which shows a further embodiment of the present invention.

The second semiconductor switching devices D21 to D2$n$ are connected between the first ends of the secondary windings of the transformers T1 to Tn and the anodes of the batteries B1 to Bn, and are operated to supply energy from the secondary windings to the batteries B1 to Bn.

Further, the second semiconductor switching devices D21 to D2$n$ prevent a charge, supplied by the batteries B1 to Bn, from being supplied to the secondary windings of the transformers T1 to Tn when energy from the secondary windings of the transformers T1 to Tn is supplied to the batteries B1 to Bn.

The second semiconductor switching devices D21 to D2$n$ are implemented using diodes, but may be implemented using one of switching devices, such as MOSFETs, BJTs, and relays.

The redistribution switch CSW is connected between the common node of the second ends of the primary windings of the transformers T1 to Tn and the ground (GND), and functions to form a closed loop so that energy discharged from overcharged batteries can be supplied to the primary windings of transformers, which are connected in parallel with the batteries other than the overcharged batteries, and to transmit the energy supplied to the primary windings of the transformers, which are connected in parallel with the batteries other than the overcharged batteries, to the secondary windings of the transformers.

In other words, the redistribution switch CSW is turned on in response to a high-level third drive signal, provided by the voltage detection and drive signal generation unit 100, thus forming a closed loop so that energy discharged from the series-connected batteries is supplied to the primary windings of the transformers connected in parallel with the batteries other than the overcharged batteries. Further, the redistribution switch CSW is turned off in response to a low-level fourth drive signal, thus transferring the energy stored in the primary windings of the transformers, connected in parallel with batteries other than the overcharged batteries, to the secondary windings.

For this operation, the redistribution switch CSW is turned on/off at the same time that the charge/discharge control switches SW1 to SWn are turned on/off, or subsequently thereto.

The redistribution switch CSW is implemented using an N-type MOSFET, but is not limited to an N-type MOSFET, and may be implemented using one of switching devices, such as a P-type MOSFET, a BJT, a diode, and a relay.

The voltage detection and drive signal generation unit 100 detects the voltages of respective N series-connected batteries B1 to Bn, compares the detected voltages with a reference voltage, generates high-level first and third drive signals and low-level second and fourth drive signals in order to discharge batteries charged to voltages greater than the reference voltage, that is, overcharged batteries, when the detected voltages are greater than the reference voltage, and to charge the batteries other than the overcharged batteries, and provides the first to fourth drive signals to the charge/discharge control switches SW1 to SWn and the redistribution switch CSW. Here, the term 'reference voltage' means the average voltage of the voltages detected from the batteries B1 to Bn.

The voltage detection and drive signal generation unit 100 provides the low-level second drive signal to the charge/discharge control switches connected in parallel with the overcharged batteries, and provides the high-level first drive signal to the charge/discharge control switches connected in parallel with the batteries other than the overcharged batteries.

Further, the voltage detection and drive signal generation unit 100 provides the high-level third drive signal to the redistribution switch CSW when energy is discharged from the series-connected batteries, and provides the low-level fourth drive signal to the redistribution switch CSW when the batteries other than the overcharged batteries, are charged.

If only a small number of arbitrary batteries is charged with a charge when almost all of the charge/discharge control switches are turned on or when the charge equalization of the batteries is almost completed, the voltage detection and drive signal generation unit 100 provides the third and fourth drive signals, each formed as a Pulse Width Modulated (PWM) signal having a low duty ratio, to the redistribution switch CSW. This is performed to initially discharge a small amount of charge from the N series-connected batteries in order to prevent excessive current from flowing into the batteries that are currently being charged.

Further, the voltage detection and drive signal generation unit 100 provides the first drive signal and the second drive signal, which have different or identical ON/OFF times, to the charge/discharge control switches SW1 to SWn.

Accordingly, more energy is supplied to the primary winding of a transformer connected in parallel with a battery having a relatively low voltage, among the overdischarged batteries, and less energy is supplied to the primary winding of a transformer connected in parallel with a battery having a relatively high voltage.

The voltage detection and drive signal generation unit 100 may simultaneously provide the first and second drive signals and the third and fourth drive signals to the charge/discharge control switches SW1 to SWn and the redistribution switch CSW, or may provide the third or fourth drive signal to the redistribution switch CSW after providing the first or second drive signal to the charge/discharge control switches SW1 to SWn.

For this operation, as shown in FIG. 3, the voltage detection and drive signal generation unit 100 includes a sensing unit 102, a microprocessor 104, and a switch driving circuit unit 106.

The sensing unit 102 is connected to the batteries B1 to Bn and is configured to detect the voltages of respective batteries B1 to Bn.

The microprocessor 104 sets the average voltage of the batteries B1 to Bn, the voltages of which are detected by the sensing unit 102, as the reference voltage, and sets the ON/OFF times of the charge/discharge control switches SW1 to SWn and the redistribution switch CSW, required to charge/discharge the batteries, when it is determined that the voltages detected by the sensing unit 102 are greater than, or have the possibility of being greater than, the reference voltage.

The switch driving circuit unit 106 generates the first drive signal, the second drive signal, the third drive signal and the fourth drive signal in response to a signal input from the microprocessor 104, and provides the signals to respective charge/discharge control switches SW1 to SWn and the redistribution switch CSW.

The charge equalization apparatus according to an embodiment of the present invention is implemented such that small-capacity transformers are respectively connected in parallel with the series-connected batteries B1 to Bn, regardless of the number of N series-connected batteries B1 to Bn, thus enabling the primary windings and the secondary windings of the transformers to be easily manufactured while maintaining excellent charge equalization characteristics.

Further, the charge equalization apparatus according to an embodiment of the present invention can control the flow of charges into batteries depending on the charged states of the N series-connected batteries B1 to Bn through the use of the charge/discharge control switches SW1 to SWn, which are connected in series with the primary windings of the transformers T1 to Tn.

Furthermore, the charge equalization apparatus according to an embodiment of the present invention can control the PWM duty ratio of the drive signal applied to the redistribution switch CSW in the case where overcurrent flows through a small number of arbitrary batteries when the charge equalization of batteries is almost completed, or when almost all of the charge/discharge control switches are turned on, thus preventing overcurrent from flowing into batteries that are currently being charged.

A method of equalizing the voltages of series-connected batteries using the charge equalization apparatus according to an embodiment of the present invention is described below.

In this case, the charge equalization apparatus according to the embodiment of the present invention is implemented on the basis of fundamental rules, in which the charge equalization of series-connected batteries B1 to Bn is performed when an electrical charging device or an electrical load is not connected to the series-connected batteries B1 to Bn. However, when current capacity is so high that the primary windings of the transformers T1 to Tn and the redistribution switch CSW act as a bypass circuit, or when the magnitude of charging current or discharging current is small, the charges of series-connected batteries B1 to Bn can be equalized even if an electrical charging device or an electrical load is connected to the series-connected batteries B1 to Bn.

First, the voltage detection and drive signal generation unit 100 detects the voltages of respective N series-connected batteries B1 to Bn.

In order to discharge overcharged batteries or almost overcharged batteries if it is determined that the voltages of some of the N series-connected batteries B1 to Bn are greater than, or have the possibility of being greater than, the reference voltage, and to charge the batteries other than the overcharged batteries, that is, overdischarged batteries, the voltage detection and drive signal generation unit 100 provides the low-level second drive signal to the charge/discharge control switches, which are connected in series with the primary windings of the transformers connected in parallel with the overcharged batteries, and provides the high-level first drive signal to the charge/discharge control switches, which are connected in series with the primary windings of the transformers connected in parallel with the overdischarged batteries.

Accordingly, the charge/discharge control switches, which are connected in series with the primary windings of the transformers connected in parallel with the overcharged batteries, are turned off, and the charge/discharge control switches, which are connected in series with the primary windings of the transformers connected in parallel with the batteries other than the overcharged batteries, are turned on.

Further, the voltage detection and drive signal generation unit 100 turns on the redistribution switch CSW by providing a high-level third drive signal to the redistribution switch CSW.

At this time, the voltage detection and drive signal generation unit 100 may simultaneously operate the charge/discharge control switches and the redistribution switch by simultaneously providing the first, second and third drive signals to the charge/discharge control switches and the redistribution switch, or may operate the redistribution switch after operating the charge/discharge control switches by providing the first and second drive signals to the charge/discharge control switches.

Accordingly, the charge discharged from the series-connected batteries B1 to Bn is converted into magnetic energy, and is stored in the primary windings of the transformers connected in parallel with the batteries other than the overcharged batteries, that is, overdischarged batteries.

For example, when batteries other than the first battery B1 and the N-th battery Bn are overcharged, the voltage detection and drive signal generation unit 100 provides the high-level first drive signal both to the first charge/discharge control switch SW1 and to the N-th charge/discharge control switch SWn, and provides the low-level second drive signal to the remaining charge/discharge control switches SW2 to SWn−1.

Further, the voltage detection and drive signal generation unit 100 provides the high-level third drive signal to the redistribution switch CSW.

Figure 4:
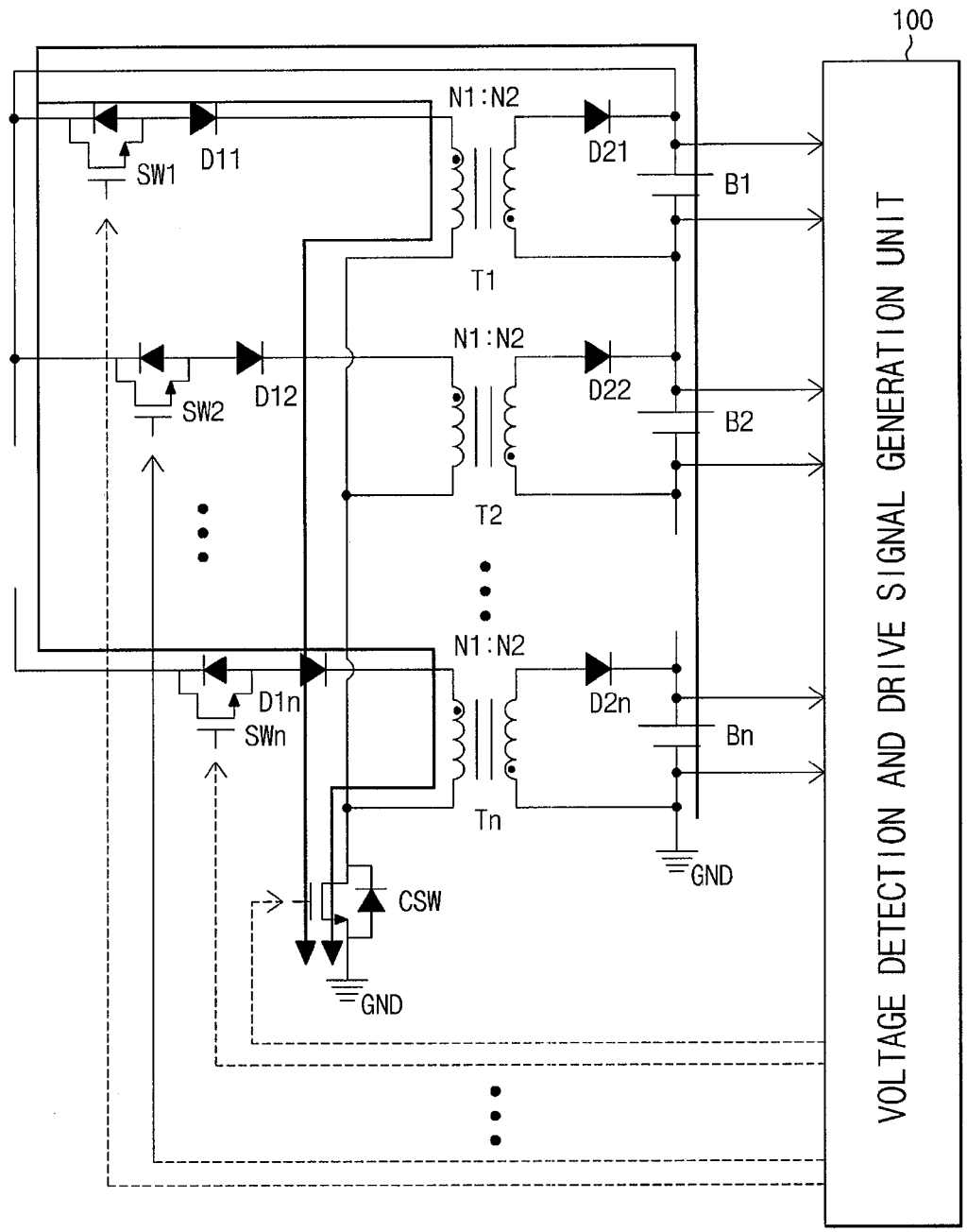
FIGS. 4 and 5 are diagrams showing a closed loop for equalizing the charges of batteries in the charge equalization apparatus of FIG. 2.

Accordingly, as shown in FIG. 4, the charge discharged from the series-connected batteries B1 to Bn is converted into magnetic energy, and is stored in the primary windings of the first transformer T1 and the N-th transformer Tn. Energy is not charged in the remaining transformers T2 to Tn−1, but is charged in the first transformer T1 and the N-th transformer Tn.

That is, the second switch SW2 to the N−1-th switch SWn−1 form an open circuit so that a charge supplied by the series-connected batteries B1 to Bn is prevented from being stored in the primary windings of the second transformer T2 to the N−1-th transformer Tn−1.

Thereafter, the voltage detection and drive signal generation unit 100 turns off the redistribution switch CSW by providing a low-level fourth drive signal to the redistribution switch CSW.

Figure 5:
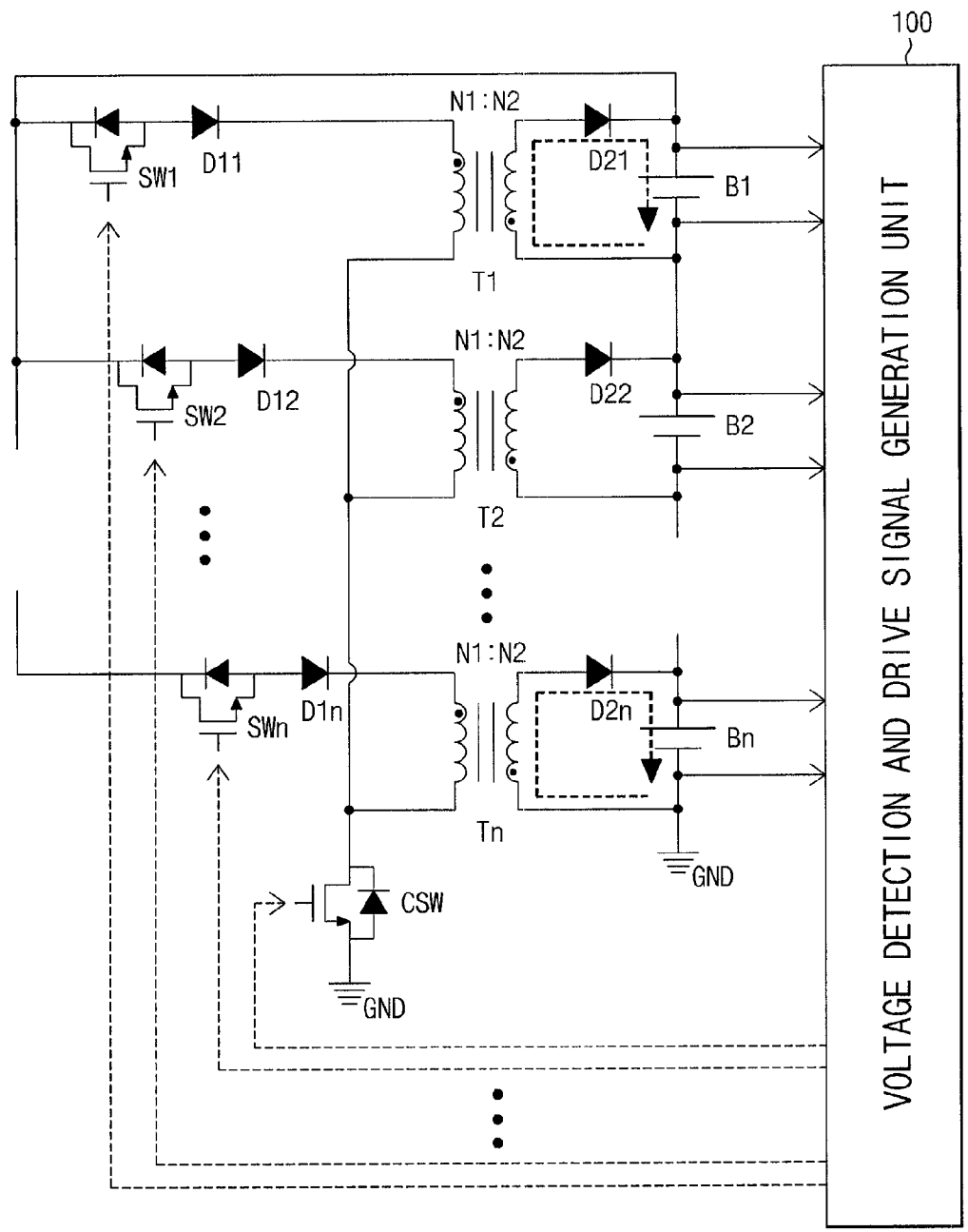

Accordingly, as shown in FIG. 5, a counter-electromotive force is produced, so that energy stored in the primary windings of the transformers T1 and Tn connected in parallel with the first battery B1 and the N-th battery Bn is transferred to the secondary windings thereof, and is thus converted into a charge. The charge is supplied to the batteries other than the overcharged batteries, through the second semiconductor switching devices D21 and D2n connected in series with the secondary windings. As a result, the batteries other than the overcharged batteries are charged with the charge supplied through the second semiconductor switching devices D21 and D2n.

This procedure is repeated until the voltages of the N series-connected batteries B1 to Bn are equalized. For this purpose, the voltage detection and drive signal generation unit 100 generates both the first drive signal and the second drive signal by continuing to detect the voltages of the N series-connected batteries B1 to Bn, and then provides the first drive signal and the second drive signal to the charge/discharge control switches SW1 to SWn and the redistribution switch CSW.

Figure 6:
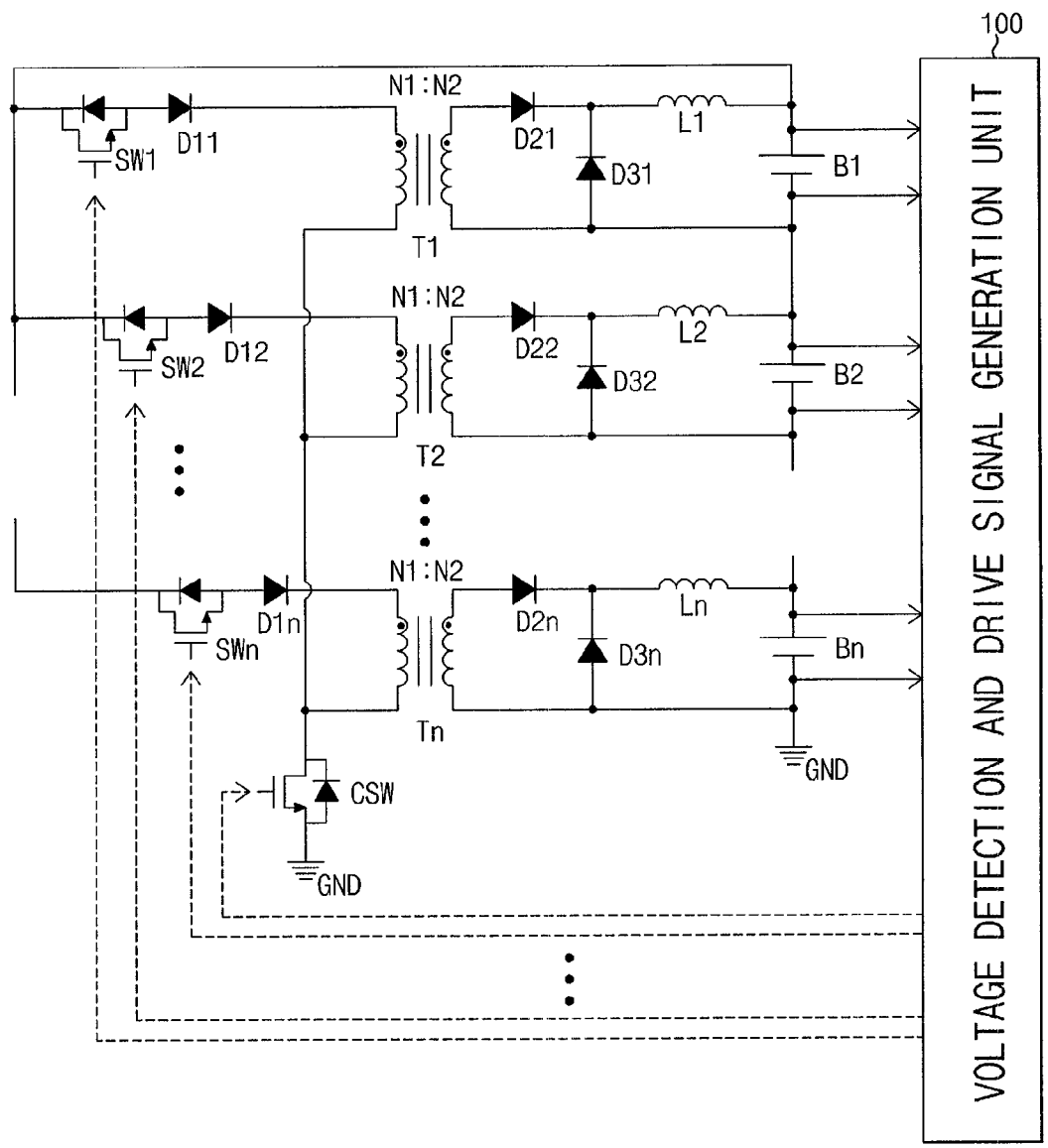
FIG. 6 is a diagram showing a charge equalization apparatus according to another embodiment of the present invention.

FIG. 6 is a diagram showing a charge equalization apparatus according to another embodiment of the present invention.

Referring to FIG. 6, the charge equalization apparatus according to another embodiment of the present invention includes N transformers T1 to Tn, which are respectively connected in parallel with the N series-connected batteries B1 to Bn, N charge/discharge control switches SW1 to SWn, which are respectively connected in series with the first ends of the primary windings of the N transformers T1 to Tn, N first semiconductor switching devices D11 to D1n, which are respectively connected between the charge/discharge control switches SW1 to SWn and the primary windings of the transformers T1 to Tn, second semiconductor switching devices D21 to D2n and inductors L1 to Ln, which are connected in series between the first ends of the secondary windings of the N transformers T1 to Tn and the cathodes (+) of the batteries B1 to Bn, third semiconductor switching devices D31 to D3n, which are connected between the common nodes of the second ends of the secondary windings of the transformers T1 to Tn and the cathodes of the batteries B1 to Bn and the common nodes of the second semiconductor switching devices D21 to D2n and the inductors L1 to Ln, a redistribution switch CSW, which is connected between the second ends of the primary windings of the transformers T1 to Tn and the ground (GND), and a voltage detection and drive signal generation unit 100, which detects the voltages of the batteries B1 to Bn and controls the operation of the charge/discharge control switches SW1 to SWn and the redistribution switch CSW using the detected voltages.

The transformers T1 to Tn are respectively connected in parallel with the N series-connected batteries B1 to Bn so as to decrease the voltages of batteries having voltages greater than a reference voltage, that is, overcharged batteries, among the N series-connected batteries B1 to Bn, to the reference voltage, and to increase the voltages of batteries having voltages less than the reference voltage, that is, overdischarged batteries, to the reference voltage.

The first ends (terminals on which dots are formed) of the primary windings of the transformers T1 to Tn are connected in common to the cathode (+) of the first battery B1 of the series-connected batteries through the charge/discharge control switches SW1 to SWn and the first semiconductor switching devices D11 to D1n, and the second ends thereof (terminals on which dots are not formed) are connected in common to the first end of the redistribution switch CSW.

Further, the first ends (terminals on which dots are formed) of the secondary windings of the transformers T1 to Tn are connected to the cathodes (+) of the batteries B1 to Bn through the second semiconductor switching devices D21 to D2n and the inductors L1 to Ln, and the second ends thereof (terminals on which dots are not formed) are connected to respective anodes (−) of the batteries B1 to Bn.

In this case, each of the transformers T1 to Tn is implemented using a forward structure in which a primary winding and a secondary winding have the same polarity, that is, in which a dot formed on the primary winding and a dot formed on the secondary winding are placed on the same side. In each of the transformers T1 to Tn, the turns ratio of the primary winding to the secondary winding is N1:N2, where N1 is greater than N2.

The charge/discharge control switches SW1 to SWn are connected between the cathode (+) of the battery B1 and the anodes of the first semiconductor switching devices D11 to D1n, and are configured such that they are turned on in response to a high-level first drive signal, provided by the voltage detection and drive signal generation unit 100, and supply energy, discharged from the N series-connected batteries B1 to Bn, to the primary windings of transformers, which are connected in parallel with the batteries other than the overcharged batteries, and such that they are turned off in response to a low-level second drive signal, provided by the voltage detection and drive signal generation unit 100, and prevent current from flowing through the primary windings of transformers, which are connected in parallel with the overcharged batteries.

For this purpose, the charge/discharge control switches, connected in parallel with the overcharged batteries, receive the low-level second drive signal from the voltage detection and drive signal generation unit 100. The charge/discharge control switches, connected in parallel with the batteries other than the overcharged batteries, receive the high-level first drive signal.

Accordingly, current flows through the primary windings of the transformers, connected in parallel with the batteries other than overcharged batteries, whereas current does not flow through the primary windings of the transformers, connected in parallel with the overcharged batteries, because current is blocked by the charge/discharge control switches.

The charge/discharge control switches SW1 to SWn are turned on or off at different times depending on the voltages detected from overdischarged batteries among the series-connected batteries B1 to Bn.

In other words, when, of the series-connected batteries B1 to Bn, the first battery B1 and the third battery B3 are overdischarged, the charge/discharge control switches SW1 to SWn are operated such that more energy is supplied to the primary winding of a transformer connected in parallel with one of the two batteries having a lower voltage value.

That is, of the two batteries, the battery having the lower voltage is provided with a high-level drive signal that is maintained for a longer time so that the battery is charged for a longer time, and the battery having the higher voltage is provided with a high-level drive signal that is maintained for a shorter time so that the battery is charged for a shorter time. As a result, the voltages of the two overdischarged batteries are equalized to the reference voltage.

For this purpose, the charge/discharge control switches SW1 to SWn receive the first drive signal and the second drive signal, having different or identical times, from the voltage detection and drive signal generation unit 100.

The charge/discharge control switches SW1 to SWn are implemented using N-type MOSFETs, but are not limited to N-type MOSFETs, and may be implemented using one of switching devices, such as P-type MOSFETs, BJTs, diodes, and relays.

The first semiconductor switching devices D11 to D1$n$ are connected between the first ends of the primary windings of the transformers T1 to Tn and the charge/discharge control switches SW1 to SWn and are operated to supply energy, supplied by the N series-connected batteries B1 to Bn, to the primary windings of the transformers T1 to Tn.

Further, the first semiconductor switching devices D11 to D1$n$ prevent energy, stored in the primary windings of the transformers T1 to Tn, from being supplied to the series-connected batteries B1 to Bn when a charge supplied by the series-connected batteries B1 to Bn is supplied to the primary windings of the transformers T1 to Tn.

The first semiconductor switching devices D11 to D1$n$ are connected between the charge/discharge control switches SW1 to SWn and the primary windings of the transformers T1 to Tn, but may alternatively be connected between the cathode (+) of the first battery B1 of the series-connected batteries B1 to Bn and the charge/discharge control switches SW1 to SWn.

In other words, the locations of the charge/discharge control switches SW1 to SWn and the first semiconductor switching devices D11 to D1$n$ can be exchanged with each other.

In this embodiment, the first semiconductor switching devices D11 to D1$n$ are implemented using diodes, but may be implemented using one of switching devices, such as MOSFETs, BJTs, and relays.

Since the charge/discharge control switches SW1 to SWn and the first semiconductor switching devices D11 to D1$n$ form a charge/discharge path when the N series-connected batteries B1 to Bn are charged or discharged, and prevent a charge supplied by the primary windings of the transformers T1 to Tn from being supplied to the N series-connected batteries B1 to Bn, they can be designated as charge/discharge control switching units.

In this case, the charge/discharge control switching units operate in only one direction because they prevent the charge supplied by the primary windings of the transformers T1 to Tn from being supplied to the N series-connected batteries B1 to Bn through the use of the first semiconductor switching devices D11 to D1$n$.

However, when the charge/discharge control switches and the first semiconductor switching devices of the charge/discharge control switching units are implemented using the same type of MOSFET, and the internal diodes of thereof are arranged in opposite directions, the charge/discharge control switching units may be bidirectionally operated. In this case, the same drive signal must be provided to the gates of the charge/discharge control switches and the first semiconductor switching devices. This will be described in detail later with reference to FIG. 9, which shows a further embodiment of the present invention.

The second semiconductor switching devices D21 to D2$n$ are connected between the first ends of the secondary windings of the transformers T1 to Tn and the inductors L1 to Ln, and are operated to supply energy from the secondary windings of the transformers to the batteries B1 to Bn through the inductors L1 to Ln.

Further, the second semiconductor switching devices D21 to D2$n$ prevent a charge, supplied by the batteries B1 to Bn, from being supplied to the secondary windings of the transformers T1 to Tn when energy from the secondary windings of the transformers T1 to Tn is supplied to the batteries B1 to Bn.

The second semiconductor switching devices D21 to D2$n$ are implemented using diodes, but may be implemented using one of switching devices, such as MOSFETs, BJTs, and relays.

The inductors L1 to Ln are connected between the cathodes of the second semiconductor switching devices D21 to D2$n$ and the cathodes (+) of the batteries B1 to Bn, and are configured to store the energy, supplied by the secondary windings of the transformers T1 to Tn when the redistribution switch CSW is turned on, and to supply the stored energy to the batteries B1 to Bn when the redistribution switch CSW is turned off.

The third semiconductor switching devices D31 to D3$n$ are connected between the common nodes of the second ends of the secondary windings of the transformers T1 to Tn and the anodes (−) of the batteries B1 to Bn and the common nodes of the cathodes of the second semiconductor switching devices D21 to D2$n$ and the inductors L1 to Ln, and are configured to form a closed loop so that the energy stored in the inductors L1 to Ln is supplied to the batteries B1 to Bn.

The third semiconductor switching devices D31 to D3$n$ are implemented using diodes, but may be implemented using one of switching devices, such as MOSFETs, BJTs, and relays.

The redistribution switch CSW is connected between the common node of the second ends of the primary windings of the transformers T1 to Tn and the ground (GND), and functions to form a closed loop so that energy discharged from the series-connected batteries is supplied to the primary windings of transformers connected in parallel with the batteries other than overcharged batteries, and to transfer energy supplied to the primary windings of transformers, connected in parallel with the batteries other than the overcharged batteries, to the secondary windings of the transformers.

In other words, the redistribution switch CSW is turned on in response to a high-level third drive signal, provided by the voltage detection and drive signal generation unit 100, thus forming a closed loop so that energy discharged from the overcharged batteries is supplied to the primary windings of the transformers connected in parallel with the batteries other than the overcharged batteries.

In this case, the energy supplied to the primary windings of the transformers T1 to Tn is transferred to the secondary windings thereof. In other words, since the dots of the primary windings and the secondary windings of the transformers T1 to Tn are formed on the same side, the energy supplied to the primary windings of the transformers T1 to Tn when the redistribution switch CSW is turned on is immediately transferred to the secondary windings thereof.

Accordingly, the energy transferred to the secondary windings of the transformers T1 to Tn is supplied to the batteries other than the overcharged batteries, that is, overdischarged batteries, through the third semiconductor switching devices D21 to D2n and the inductors L1 to Ln. As a result, the overdischarged batteries are charged.

Further, the redistribution switch CSW is turned off in response to a low-level fourth drive signal provided by the voltage detection and drive signal generation unit 100, and is configured to generate a counter-electromotive force on the inductors L1 to Ln and to charge the batteries other than the overcharged batteries with the energy stored in the inductors L1 to Ln.

The redistribution switch CSW is turned on/off at the same time that the charge/discharge control switches SW1 to SWn are turned on/off, or subsequently thereto.

Further, the redistribution switch CSW is implemented using an N-type MOSFET, but is not limited to an N-type MOSFET, and may be implemented using one of switching devices, such as a P-type MOSFET, a BJT, a diode, and a relay.

The voltage detection and drive signal generation unit 100 detects the voltages of respective N series-connected batteries B1 to Bn, compares the detected voltages with a reference voltage, generates high-level first and third drive signals and low-level second and fourth drive signals in order to discharge overcharged batteries and to charge the batteries other than the overcharged batteries, and provides the first to fourth drive signals to the charge/discharge control switches SW1 to SWn and the redistribution switch CSW. Here, the term 'reference voltage' means the average voltage of the voltages detected from the batteries B1 to Bn.

The voltage detection and drive signal generation unit 100 provides the low-level second drive signal to the charge/discharge control switches, which are connected in series with the primary windings of the transformers connected in parallel with the overcharged batteries, and provides the high-level first drive signal to the charge/discharge control switches, which are connected in series with the primary windings of the transformers connected in parallel with the batteries other than the overcharged batteries.

Further, the voltage detection and drive signal generation unit 100 provides the high-level third drive signal to the redistribution switch CSW when energy is discharged from the overcharged batteries, and provides the low-level fourth drive signal to the redistribution switch CSW when the batteries other than the overcharged batteries are charged.

In this case, if only a small number of arbitrary batteries is charged with the charge when almost all of the charge/discharge control switches are turned on or when the charge equalization of the batteries is almost completed, the voltage detection and drive signal generation unit 100 provides both the third and fourth drive signals, each formed as a Pulse Width Modulated (PWM) signal having a low duty ratio, to the redistribution switch CSW. This is performed to initially discharge a small amount of charge from the N series-connected batteries in order to prevent excessive current from flowing into the batteries that are currently being charged.

Further, the voltage detection and drive signal generation unit 100 provides the first and second drive signals, having identical or different ON/OFF times, to the charge/discharge control switches SW1 to SWn.

Accordingly, more energy is supplied to the primary winding of a transformer that is connected in parallel with a battery having a relatively low voltage, among the overdischarged batteries, and less energy is supplied to the primary winding of a transformer that is connected in parallel with a battery having a relatively high voltage.

The voltage detection and drive signal generation unit 100 may simultaneously provide the first and second drive signals and the third and fourth drive signals to the charge/discharge control switches SW1 to SWn and the redistribution switch CSW, or may provide the third or fourth drive signal to the redistribution switch CSW after providing the first or second drive signal to the charge/discharge control switches SW1 to SWn.

For this operation, as shown in FIG. 3, the voltage detection and drive signal generation unit 100 includes a sensing unit 102, a microprocessor 104, and a switch driving circuit unit 106.

The sensing unit 102 is connected to the batteries B1 to Bn and is configured to detect the voltages of respective batteries B1 to Bn.

The microprocessor 104 sets the average voltage of the batteries B1 to Bn, the voltages of which are detected by the sensing unit 102, as the reference voltage, and sets the ON/OFF times of the charge/discharge control switches SW1 to SWn and the redistribution switch CSW, required to charge/discharge the batteries, when it is determined that the voltages detected by the sensing unit 102 are greater than, or have the possibility of being greater than, the reference voltage.

The switch driving circuit unit 106 generates the first drive signal, the second drive signal, the third drive signal and the fourth drive signal in response to a signal input from the microprocessor 104, and provides the signals to respective charge/discharge control switches SW1 to SWn and the redistribution switch CSW.

The charge equalization apparatus according to another embodiment of the present invention is implemented such that small-capacity transformers are respectively connected in parallel with series-connected batteries B1 to Bn, regardless of the number of N series-connected batteries B1 to Bn, thus enabling the primary windings and the secondary windings of the transformers to be easily manufactured while maintaining excellent charge equalization characteristics.

Further, the charge equalization apparatus according to another embodiment of the present invention can control the flow of charges into batteries depending on the charged states of the N series-connected batteries B1 to Bn through the use of the charge/discharge control switches SW1 to SWn, which are connected in series with the primary windings of the transformers T1 to Tn.

Furthermore, the charge equalization apparatus according to another embodiment of the present invention can control the PWM duty ratio of the drive signal applied to the redistribution switch CSW in the case where overcurrent flows through a small number of arbitrary batteries when the charge equalization of batteries is almost completed, or when almost all of the charge/discharge control switches are turned on, thus preventing overcurrent from flowing into batteries that are currently being charged.

A method of equalizing the voltages of series-connected batteries using the charge equalization apparatus according to another embodiment of the present invention is described below.

In this case, the charge equalization apparatus according to another embodiment of the present invention is implemented on the basis of fundamental rules, in which the charge equalization of series-connected batteries B1 to Bn is performed when an electrical charging device or an electrical load is not connected to the series-connected batteries B1 to Bn. However, when current capacity is so high that the primary windings of the transformers T1 to Tn and the redistribution switch CSW act as a bypass circuit, or when the magnitude of charging current or discharging current is small, the charges of series-connected batteries B1 to Bn can be equalized even if an electrical charging device or an electrical load is connected to the series-connected batteries B1 to Bn.

First, the voltage detection and drive signal generation unit 100 detects the voltages of respective N series-connected batteries B1 to Bn.

In order to discharge overcharged batteries or almost overcharged batteries if it is determined that the voltages of some of the N series-connected batteries B1 to Bn are greater than, or have the possibility of being greater than, the reference voltage, and to charge the batteries other than the overcharged batteries, that is, overdischarged batteries, the voltage detection and drive signal generation unit 100 provides the low-level second drive signal to the charge/discharge control switches, which are connected in series with the primary windings of the transformers connected in parallel with the overcharged batteries, and provides the high-level first drive signal to the charge/discharge control switches, which are connected in series with the primary windings of the transformers connected in parallel with the overdischarged batteries.

Accordingly, the charge/discharge control switches, which are connected in series with the primary windings of the transformers connected in parallel with the overcharged batteries, are turned off, and the charge/discharge control switches, which are connected in series with the primary windings of the transformers connected in parallel with the batteries other than the overcharged batteries, are turned on.

Further, the voltage detection and drive signal generation unit 100 turns on the redistribution switch CSW by providing a high-level third drive signal to the redistribution switch CSW.

At this time, the voltage detection and drive signal generation unit 100 may simultaneously operate the charge/discharge control switches and the redistribution switch by simultaneously providing the first, second and third drive signals to the charge/discharge control switches and the redistribution switch, or may operate the redistribution switch CSW by providing the third drive signal to the redistribution switch CSW after operating the charge/discharge control switches by providing the first and second drive signals to the charge/discharge control switches.

Accordingly, the charge discharged from the series-connected batteries B1 to Bn is converted into magnetic energy, and is stored in the primary windings of the transformers connected in parallel with the batteries other than the overcharged batteries, that is, overdischarged batteries.

For example, when batteries other than the first battery B1 and the N-th battery Bn are overcharged, the voltage detection and drive signal generation unit 100 provides the high-level first drive signal both to the first charge/discharge control switch SW1 and to the N-th charge/discharge control switch SWn, and provides the low-level second drive signal to the remaining charge/discharge control switches SW2 to SWn−1.

Further, the voltage detection and drive signal generation unit 100 provides the high-level third drive signal to the redistribution switch CSW.

Figure 7:
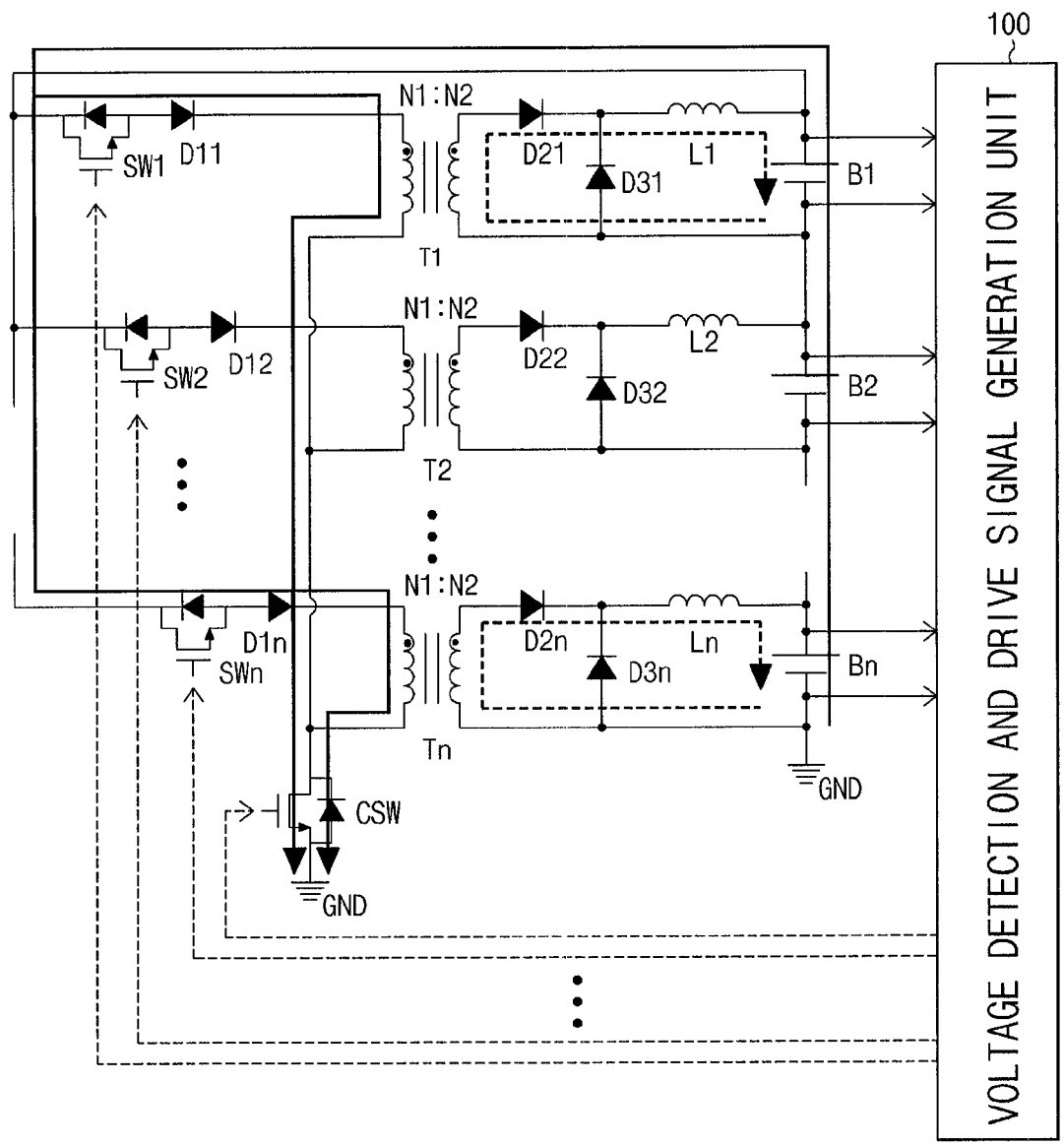
FIGS. 7 and 8 are diagrams showing a closed loop for equalizing the charges of batteries in the charge equalization apparatus of FIG. 6.

Accordingly, as shown in FIG. 7, the charge discharged from the series-connected batteries B1 to Bn is converted into magnetic energy, and is stored in the primary windings of the first transformer T1 and the N-th transformer Tn. Energy is not charged in the remaining transformers T1 to Tn−1, but is charged in the first transformer T1 and the N-th transformer Tn.

That is, the second switches SW2 to the N−1-th switch SWn−1 form an open circuit so that the charge supplied by the series-connected batteries B1 to Bn is prevented from being stored in the primary windings of the second transformer T2 to the N−1-th transformer Tn−1.

At this time, the energy, stored in the primary windings of the first transformer T1 and the N-th transformer Tn, connected in parallel with the first battery B1 and the N-th battery Bn, respectively, is transferred to the secondary windings thereof. The energy, transferred to the secondary windings, is converted into a charge, and is charged in the first battery B1 and the N-th battery Bn through the second semiconductor switching devices D21 and D2n and the inductors L1 and Ln. Further, the charge, supplied through the secondary windings of the first transformer T1 and the N-th transformer Tn, is converted into magnetic energy and is stored in the inductors L1 and Ln.

Thereafter, the voltage detection and drive signal generation unit 100 turns off the redistribution switch CSW by providing the low-level fourth drive signal to the redistribution switch CSW.

Figure 8:
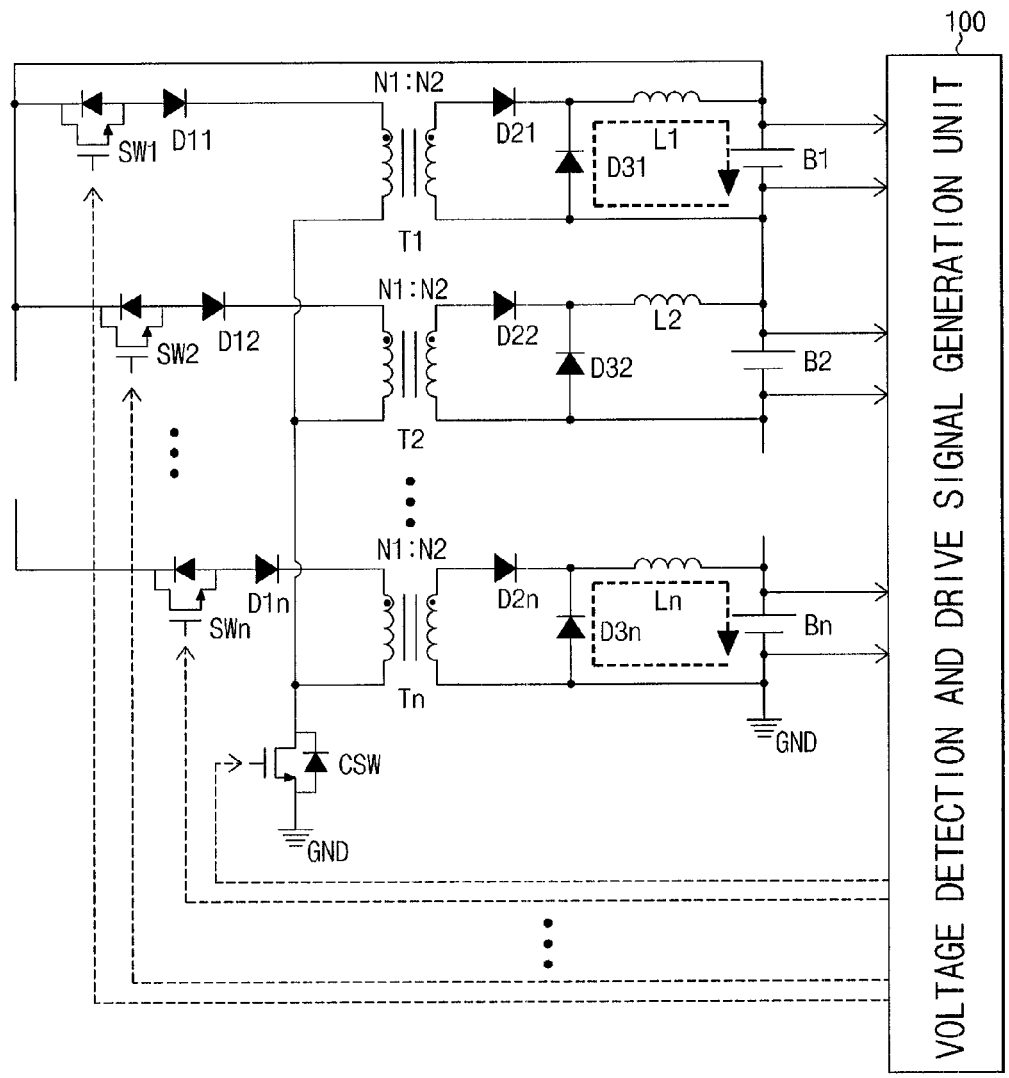

Accordingly, as shown in FIG. 8, a counter-electromotive force is generated, so that the energy stored in the inductors L1 and Ln is converted into a charge, and is charged in the first battery B1 and the N-th battery Bn.

This procedure is repeated until the voltages of the N series-connected batteries B1 to Bn are equalized. For this purpose, the voltage detection and drive signal generation unit 100 generates the first, second, third and fourth drive signals by continuing to detect the voltages of the N series-connected batteries B1 to Bn, and then provides the generated signals to the charge/discharge control switches SW1 to SWn and the redistribution switch CSW.

Figure 9:
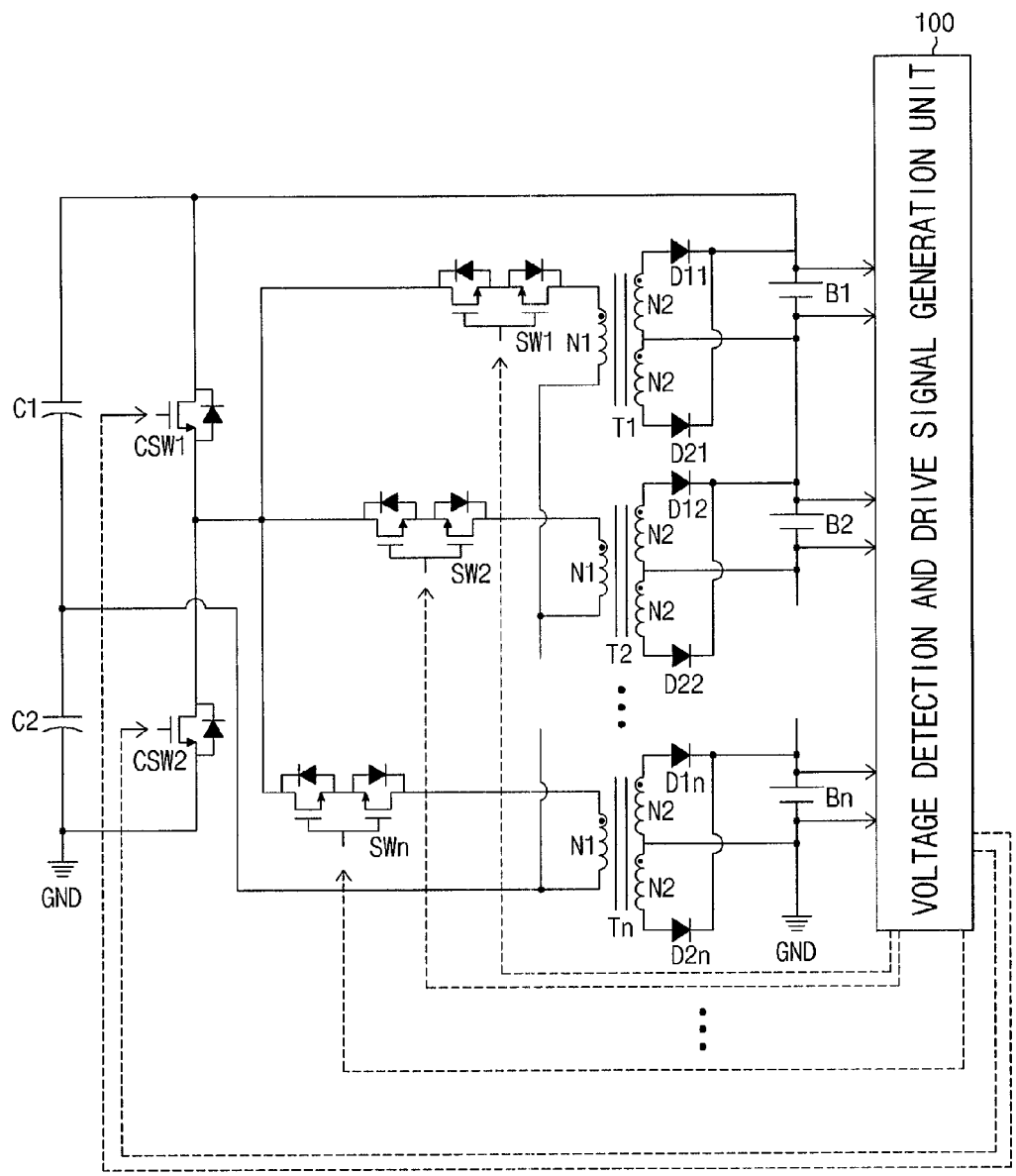
FIG. 9 is a diagram showing a charge equalization apparatus according to a further embodiment of the present invention.

FIG. 9 is a diagram showing a charge equalization apparatus according to a further embodiment of the present invention.

Referring to FIG. 9, the charge equalization apparatus according to a further embodiment of the present invention includes N transformers T1 to Tn, charging devices C1 and C2, and redistribution switches CSW1 and CSW2, which are connected in parallel with N series-connected batteries B1 to Bn, N charge/discharge control switches SW1 to SWn, which are respectively connected in series between the first ends of the primary windings of the N transformers T1 to Tn and the common node of the redistribution switches CSW1 and CSW2, first semiconductor switching devices D11 to D1n, which are respectively connected in series between the first ends of the first secondary windings of the transformers T1 to Tn and the cathodes (+) of the batteries B1 to Bn, second semiconductor switching devices D21 to D2n, which are respectively connected in series between the second ends of the second secondary windings of the transformers T1 to Tn and the anodes of the batteries B1 to Bn, and a voltage detection and drive signal generation unit 100, which detects the voltages of the batteries B1 to Bn and controls the operation of the charge/discharge control switches SW1 to SWn and the redistribution switches CSW1 and CSW2 using the detected voltages.

The N transformers T1 to Tn are connected in parallel with the N series-connected batteries B1 to Bn so as to decrease the voltages of batteries having voltages greater than a reference voltage, that is, overcharged batteries, among the N series-connected batteries B1 to Bn, to the reference voltage, and to increase the voltages of batteries having voltages less than the reference voltage, that is, overdischarged batteries, to the reference voltage.

The first ends of the primary windings (terminals on which dots are formed) of the transformers T1 to Tn are respectively connected to the charge/discharge control switches SW1 to SWn, and the second ends thereof (terminals on which dots are not formed) are connected in common to each other, and are thus connected to the common node of the first charging device C1 and the second charging device C2.

Further, the first ends (terminals on which dots are formed) of the first secondary windings of the transformers T1 to Tn are respectively connected to the anodes of the first semiconductor switching devices D11 to D1$n$, and the second ends thereof (terminals on which dots are not formed) are respectively connected to the anodes (−) of the batteries B1 to Bn. The first ends (terminals on which dots are formed) of the second secondary windings of the transformers T1 to Tn are respectively connected to the cathodes of the batteries B1 to Bn, and the second ends thereof (terminals on which dots are not formed) are respectively connected to the anodes of the second semiconductor switching devices D21 to D2$n$.

In other words, the first ends of the primary windings of the transformers T1 to Tn are connected to the anodes of the batteries B1 to Bn through the charge/discharge control switches SW1 to SWn and the first redistribution switch CSW1, and the second ends thereof are connected in common to the ground (GND) through the second charging device C2.

Further, the first ends of the first secondary windings of the transformers T1 to Tn are respectively connected to the anodes of the batteries B1 to Bn through the first semiconductor switching devices D11 to D1$n$. The second ends of the first secondary windings and the first ends of the second secondary windings are connected in common and are connected to the cathodes of the batteries B1 to Bn. The second ends of the second secondary windings (terminals on which dots are not formed) are respectively connected to the anodes of the batteries B1 to Bn through the second semiconductor switching devices D21 to D2$n$.

The transformers T1 to Tn are each implemented using a half-bridge converter in which a primary winding, a first secondary winding and a second secondary winding have the same polarity, that is, in which a dot formed on the primary winding, a dot formed on the first secondary winding, and a dot formed on the second secondary winding are placed on the same side, and in which secondary windings are divided into two parts.

In each of the transformers T1 to Tn, the turns ratio of the primary winding to the secondary winding is N1:N2, and the first secondary winding and the second secondary winding have the same number of turns, where N1 is greater than N2.

The first and second charging devices C1 and C2 are connected in parallel with both the N series-connected batteries B1 to Bn and the transformers T1 to Tn, and store a charge supplied by the N series-connected batteries B1 to Bn.

That is, the first and second charging devices C1 and C2 are connected in series between the anode of the first battery B1 of the N series-connected batteries B1 to Bn, and the ground (GND), and are configured to store the charge supplied by the N series-connected batteries B1 to Bn.

The first and second charging devices C1 and C2 are implemented using capacitors, but may be implemented using either capacitors or batteries. Further, the first and second charging devices C1 and C2 have the same capacity.

The first redistribution switch CSW1 and the second redistribution switch CSW2 are connected in parallel with the charging devices C1 and C2 and the transformers T1 to Tn between the charging devices C1 and C2 and the transformers T1 to Tn, and are configured to form a closed loop so as to discharge batteries having voltages greater than a reference voltage, that is, overcharged batteries, among the N series-connected batteries B1 to Bn, in response to a high-level first drive signal provided by the voltage detection and drive signal generation unit 100, and to charge the batteries other than the overcharged batteries, that is, batteries having voltages equal to or less than the reference voltage.

For this purpose, the first and second redistribution switches CSW1 and CSW2 are operated such that, when overcharged batteries are discharged and the remaining batteries are charged, the second redistribution switch CSW2 is turned off if the first redistribution switch CSW1 is turned on, and the second redistribution switch CSW2 is turned on if the first redistribution switch CSW1 is turned off.

The first redistribution switch CSW1 and the second redistribution switch CSW2 are connected in series between the anode of the first battery B1 of the N series-connected batteries B1 to Bn and the ground (GND), and the common node of the first redistribution switch CSW1 and the second redistribution switch CSW2 is connected to the first ends of the charge/discharge control switches SW1 to SWn.

In this case, the first and second redistribution switches CSW1 and CSW2 are implemented using N-type MOSFETs, but may be implemented using one of switching devices, such as P-type MOSFETs, BJTs, diodes, and relays.

The charge/discharge control switches SW1 to SWn, which are bidirectional switches, are implemented using N-type MOSFETs, and are configured such that the internal diodes of each of the charge/discharge control switches are arranged in opposite directions and the gate terminals thereof are connected in common to each other. The charge/discharge control switches SW1 to SWn are connected between the common node of the first and second redistribution switches CSW1 and CSW2 and the first ends of the primary windings of the transformers T1 to Tn.

The charge/discharge control switches SW1 to SWn are turned on when a high-level third drive signal is provided by the voltage detection and drive signal generation unit 100. Accordingly, the charge supplied by the N series-connected batteries B1 to Bn is supplied to the primary windings of the transformers T1 to Tn through the bidirectional switches.

Further, the charge/discharge control switches SW1 to SWn are turned on when a low-level fourth drive signal is provided by the voltage detection and drive signal generation unit 100. Accordingly, the charge supplied by the N series-connected batteries B1 to Bn is not supplied to the primary windings of the transformers T1 to Tn. This will be described in detail later.

As described above, the charge/discharge control switches SW1 to SWn are bidirectionally operated so that the voltages of the series-connected batteries B1 to Bn are always equalized, regardless of the state (high or low) of the drive signal provided by the voltage detection and drive signal generation unit 100.

Here, the charge/discharge control switches SW1 to SWn are implemented using N-type MOSFETs, but are not limited to N-type MOSFETs, and may be implemented using one of devices, such as P-type MOSFETs, BJTs, and relays.

The voltage detection and drive signal generation unit 100 detects the voltages of respective N series-connected batteries B1 to Bn, compares the detected voltages with a reference voltage, generates high-level first and third drive signals and low-level second and fourth drive signals in order to discharge batteries charged to voltages greater than the reference voltage, that is, overcharged batteries, and to charge the batteries other than the overcharged batteries, and provides the first to fourth drive signals to the redistribution switches CSW1 and CSW2 and the charge/discharge control switches SW1 to SWn. Here, the term 'reference voltage' means the average voltage of the voltages detected from the batteries B1 to Bn.

The voltage detection and drive signal generation unit 100 alternately provides the high-level first drive signal and the low-level second drive signal to the first redistribution switch CSW1 and the second redistribution switch CSW2, which are connected in parallel with the batteries B1 to Bn, so as to discharge energy from overcharged batteries among the N series-connected batteries B1 to Bn and store energy in overdischarged batteries.

In this case, when the low-level second drive signal is provided by the voltage detection and drive signal generation unit 100 both to the first redistribution switch CSW1 and to the second redistribution switch CSW2, the operation of equalizing the charges of the series-connected batteries B1 to Bn is not performed.

Further, when the high-level first drive signal is provided to one of the first redistribution switch CSW1 and the second redistribution switch CSW2, and one of the high-level third drive signal and the low-level fourth drive signal is provided to the charge/discharge control switches SW1 to SWn by the voltage detection and drive signal generation unit 100, the overcharged batteries of the series-connected batteries B1 to Bn continue to be discharged down to the reference voltage, and overdischarged batteries continue to be charged up to the reference voltage.

Accordingly, the voltages of all of the N series-connected batteries B1 to Bn are equalized.

In this case, the voltage detection and drive signal generation unit 100 alternately provides a third drive signal and a fourth drive signal, each formed as a PWM signal having a low duty ratio, to the first redistribution switch CSW1 and the second redistribution switch CSW2 if only a small number of batteries is charged with a charge when almost all of the charge/discharge control switches are turned on or when the charge equalization of the batteries is almost completed. This is performed to initially discharge a small amount of charge from the N series-connected batteries in order to prevent excessive current from flowing into the batteries that are currently being charged.

As shown in FIG. 3, the voltage detection and drive signal generation unit 100 includes a sensing unit 102, a microprocessor 104, and a switch driving circuit unit 106.

The sensing unit 102 is connected to the batteries B1 to Bn and is configured to detect the voltages of respective batteries B1 to Bn.

The microprocessor 104 sets the average voltage of the batteries B1 to Bn, the voltages of which are detected by the sensing unit 102, as the reference voltage, and sets the ON/OFF times of the charge/discharge control switches SW1 to SWn and the redistribution switches CSW1 and CSW2 required to charge/discharge the batteries when it is determined that the voltages detected by the sensing unit 102 are greater than, or have the possibility of being greater than, the reference voltage.

The switch driving circuit unit 106 generates the first drive signal, the second drive signal, the third drive signal and the fourth drive signal in response to a signal input from the microprocessor 104, and provides the signals to respective charge/discharge control switches SW1 to SWn and respective redistribution switches CSW1 and CSW2.

The charge equalization apparatus according to a further embodiment of the present invention is implemented such that small-capacity transformers are respectively connected in parallel with series-connected batteries B1 to Bn, regardless of the number of N series-connected batteries B1 to Bn, thus enabling the primary windings and the secondary windings of the transformers to be easily manufactured while maintaining excellent charge equalization characteristics.

Further, the charge equalization apparatus according to a further embodiment of the present invention can control the flow of charges into batteries depending on the charged states of the N series-connected batteries B1 to Bn through the use of the redistribution switches CSW1 and CSW2, which are connected in parallel with the N series-connected batteries.

Furthermore, the charge equalization apparatus according to a further embodiment of the present invention can control the PWM duty ratio of the drive signal applied to the redistribution switches CSW1 and CSW2 in the case where overcurrent flows through a small number of arbitrary batteries when the charge equalization of batteries is almost completed, or when almost all of the charge/discharge control switches are turned on, thus preventing overcurrent from flowing into batteries that are currently being charged.

A method of equalizing the voltages of series-connected batteries using the charge equalization apparatus according to a further embodiment of the present invention is described below.

In this case, the charge equalization apparatus according to the further embodiment of the present invention is implemented on the basis of fundamental rules, in which the charge equalization of series-connected batteries B1 to Bn is performed when an electrical charging device or an electrical load is not connected to the series-connected batteries B1 to Bn. However, when current capacity is so high that the primary windings of the transformers T1 to Tn and the redistribution switch CSW act as a bypass circuit, or when the magnitude of charging current or discharging current is small, the charges of series-connected batteries B1 to Bn can be equalized even if an electrical charging device or an electrical load is connected to the series-connected batteries B1 to Bn.

First, the voltage detection and drive signal generation unit 100 detects the voltages of respective N series-connected batteries B1 to Bn.

In this case, the voltage detection and drive signal generation unit 100 turns off the first and second redistribution switches CSW1 and CSW2, connected in parallel with the N series-connected batteries B1 to Bn, by providing the low-level second drive signal to the switches CSW1 and CSW2.

Thereafter, in order to discharge overcharged batteries or almost overcharged batteries if it is determined that the voltages of some of the N series-connected batteries B1 to Bn are greater than, or have the possibility of being greater than, the reference voltage, and to charge the batteries other than the overcharged batteries, the voltage detection and drive signal generation unit 100 provides the high-level first drive signal to the first redistribution switch CSW1, which is connected in parallel with the N series-connected batteries B1 to Bn, and provides the low-level second drive signal to the second redistribution switch CSW2.

Further, the voltage detection and drive signal generation unit 100 provides the low-level fourth drive signal to the charge/discharge control switches, which are connected to the first ends of the primary windings of the transformers connected in parallel with the overcharged batteries, and provides the high-level third drive signal to the charge/discharge control switches, which are connected to the first ends of the primary windings of the transformers connected in parallel with the batteries other than the overcharged batteries.

As a result, the charge discharged from the N series-connected batteries B1 to Bn is converted into magnetic energy and is stored in the primary windings of the transformers connected in parallel with the batteries other than the overcharged batteries, and the magnetic energy stored in the primary windings is transferred to the first secondary windings of the transformers. The magnetic energy transferred to the first secondary windings is converted into a charge and is supplied to the batteries other than the overcharged batteries.

Figure 10:
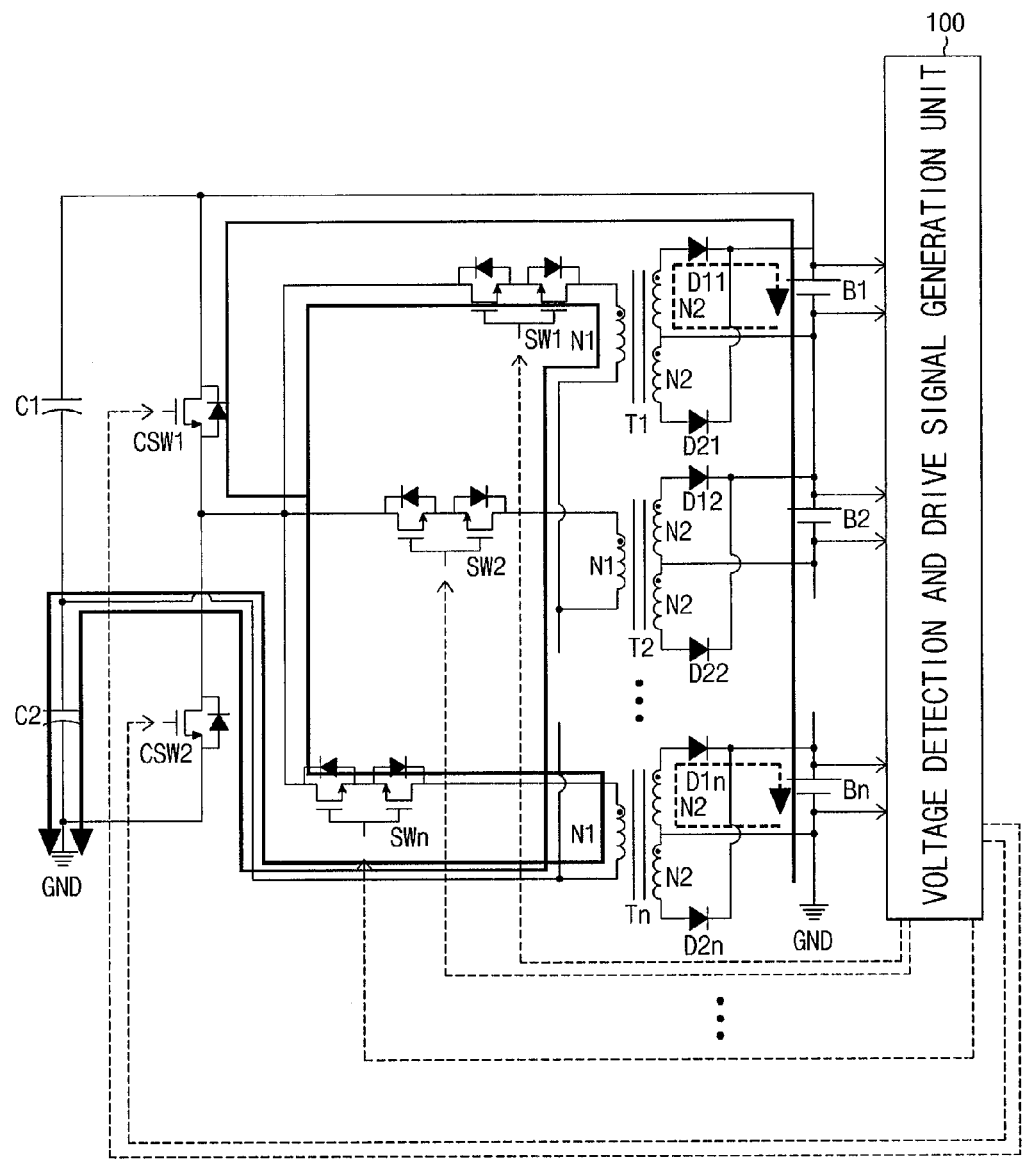
FIGS. 10 and 11 are diagrams showing a closed loop for equalizing the charges of batteries in the charge equalization apparatus of FIG. 9.

In other words, as shown in FIG. 10, when the batteries except for the first battery B1 and the N-th battery Bn are overcharged, the first redistribution switch CSW1, the first charge/discharge control switch SW1, and the N-th charge/discharge control switch SWn are turned off, and the second redistribution switch CSW2 and the second to N−1-th charge/discharge control switches SW2 to SWn−1 are turned off in response to the high-level first and third drive signals and the low-level second and fourth drive signals provided by the voltage detection and drive signal generation unit 100.

Accordingly, the charge discharged from the N series-connected batteries B1 to Bn is supplied to the primary winding of the first transformer T1 through the first redistribution switch CSW1 and the first charge/discharge control switch SW1, and is also supplied to the primary winding of the N-th transformer Tn through the first redistribution switch CSW1 and the N-th charge/discharge control switch SWn.

In this case, the charge supplied to the primary windings of the first transformer T1 and the N-th transformer Tn is transferred to the first secondary windings of the transformers, and is thus supplied to the first battery B1 and the n-th battery Bn.

Further, the charge supplied from the N series-connected batteries B1 to Bn is stored in the second charging device C2.

As a result, the battery B1 and the N-th battery Bn are charged with the charge supplied from the overcharged batteries, and the internal voltages of the batteries other than the first battery B1 and the N-th battery Bn are decreased while the remaining batteries are discharged.

Thereafter, the voltage detection and drive signal generation unit 100 provides the low-level second drive signal to the first redistribution switch CSW1, and provides the high-level first drive signal to the second redistribution switch CSW2.

As a result, the first redistribution switch CSW1 is turned off, and the second redistribution switch CSW2 is turned on.

Figure 11:
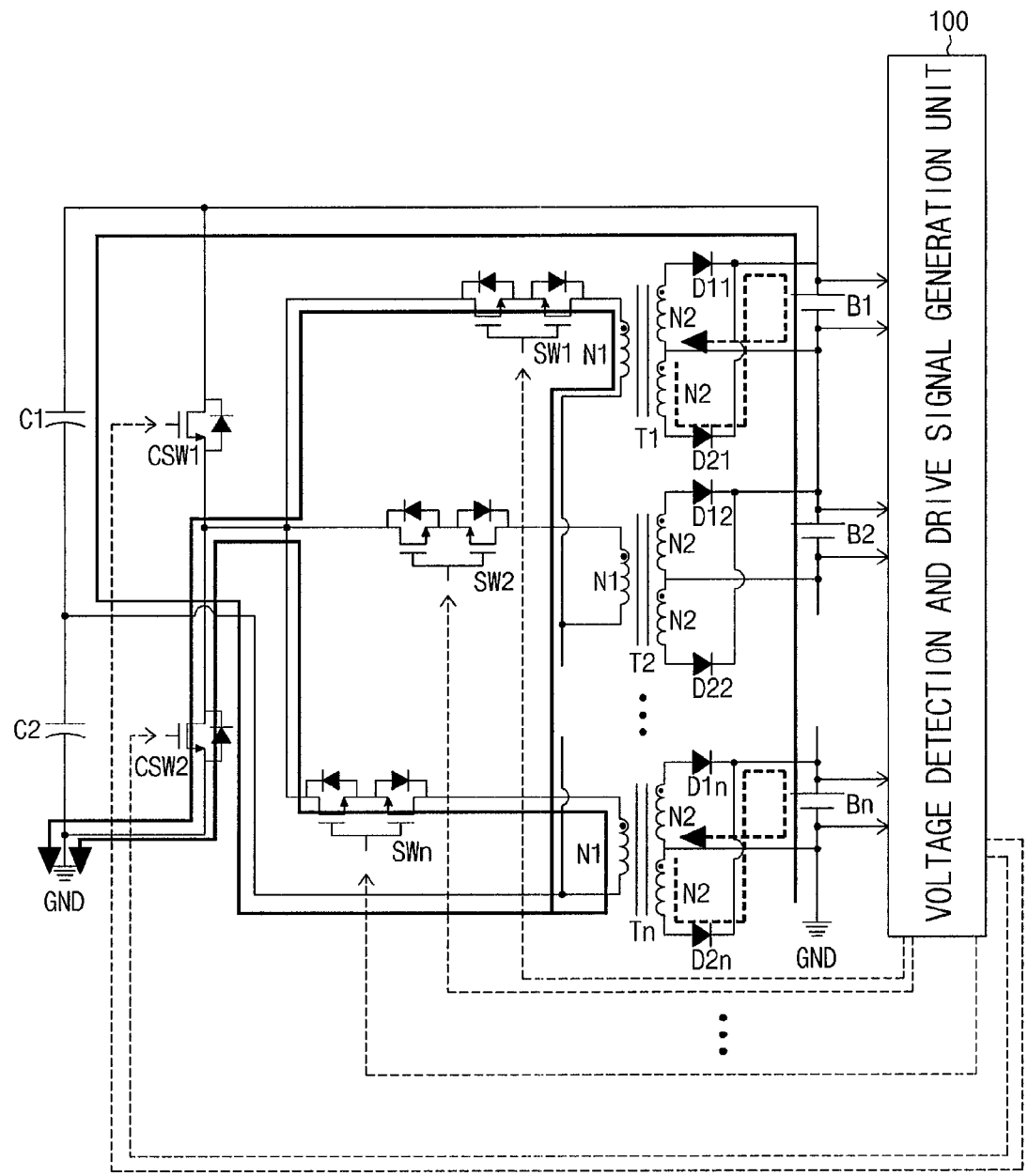

Accordingly, as shown in FIG. 11, the first charge/discharge control switch SW1 and the N-th charge/discharge control switch SWn form a closed loop together with the second redistribution switch CSW2 so that the charge discharged from the N series-connected batteries B1 to Bn is supplied to the primary windings of the first transformer T1 and the N-th transformer Tn.

At this time, since the charge supplied by the N series-connected batteries B1 to Bn is supplied to the second ends of the primary windings of the first transformer T1 and the N-th transformer Tn, current flows through the primary windings of the first transformer T1 and the N-th transformer Tn in a reverse (−) direction.

The current flowing into the primary windings of the first transformer T1 and the N-th transformer Tn flows out of the second secondary windings of the first transformer T1 and the N-th transformer Tn, and is thus supplied to the first battery B1 and the N-th battery Bn through the second semiconductor switching devices D21 and D2n.

As a result, the first battery B1 and the N-th battery Bn are charged with the charge supplied by the overcharged batteries, and the internal voltages of the batteries other than the first battery B1 and the N-th battery Bn are decreased while the remaining batteries are discharged.

This procedure is repeated until the voltages of the N series-connected batteries B1 to Bn are equalized. For this purpose, the voltage detection and drive signal generation unit 100 generates high-level first and third drive signals and low-level second and fourth drive signals by continuing to detect the voltages of the N series-connected batteries B1 to Bn, and then provides the generated signals to the first redistribution switch CSW1, the second redistribution switch CSW2, and the charge/discharge control switches SW1 to SWn.

The invention claimed is:

1. A charge equalization apparatus, comprising:
   N transformers respectively connected in parallel with N series-connected batteries, and configured to store energy, discharged from overcharged batteries, among the N batteries, and to charge batteries other than the overcharged batteries with the stored energy;
   N charge/discharge control switching units respectively connected between first ends of primary windings of the N transformers and an anode of a first battery of the N batteries so as to supply a charge, supplied by the N series-connected batteries, to the primary windings of the N transformers;
   a redistribution switch connected between a common node of second ends of the primary windings of the N transformers and a ground so as to supply the charge, supplied by the N series-connected batteries, to the primary windings of the N transformers;
   N first semiconductor switching devices respectively connected between first ends of secondary windings of the N transformers and anodes of the batteries; and
   a voltage detection and drive signal generation unit configured to detect voltages of respective N series-connected batteries, to generate a drive signal, required to drive the charge/discharge control switching units and the redistribution switch, depending on detected voltages, and to control driving of the charge/discharge control switching units and the redistribution switch.

2. The charge equalization apparatus according to claim 1, wherein, in each of the N transformers, a turns ratio of the primary winding to the secondary winding is N1:N2.

3. The charge equalization apparatus according to claim 2, wherein N1 is greater than N2.

4. The charge equalization apparatus according to claim 3, further comprising:
   N inductors respectively connected between the N first semiconductor switching devices and the anodes of the N batteries; and
   second semiconductor switching devices connected between cathodes of the N batteries and common nodes of the first semiconductor switching devices and the inductors.

5. The charge equalization apparatus according to claim 4, wherein each of the charge/discharge control switching units comprises:
   a charge/discharge control switch driven to prevent a charge supplied by the N series-connected batteries from being supplied to primary windings of transformers connected in parallel with the overcharged batteries and to supply the charge, supplied by the N series-connected batteries, to the batteries other than the overcharged batteries; and a third semiconductor switching device configured to prevent a charge supplied by the primary windings of the transformers from being supplied to the N series-connected batteries.

6. The charge equalization apparatus according to claim 5, wherein the third semiconductor switching devices are connected between the charge/discharge control switches and the first ends of the primary windings of the transformers, or between the anode of the first battery of the N series-connected batteries and the charge/discharge control switches.

7. The charge equalization apparatus according to claim 6, wherein the transformers are each implemented such that a dot formed on the primary winding and a dot formed on the secondary winding are placed on different sides.

8. The charge equalization apparatus according to claim 6, wherein the transformers are implemented such that a dot formed on the primary winding and a dot formed on the secondary winding are placed on a same side.

9. The charge equalization apparatus according to claim 6, wherein the first semiconductor switching devices, the second semiconductor switching devices, and the third semiconductor switching device are one of Metal Oxide Semiconductor Field Effect Transistors (MOSFETs), Bipolar Junction Transistors (BJTs), relays, and diodes.

10. The charge equalization apparatus according to claim 9, wherein the first semiconductor switching devices, the second semiconductor switching devices and the third semiconductor switching devices are diodes.

11. The charge equalization apparatus according to claim 6, wherein the charge/discharge control switches and the redistribution switch are one of MOSFETs, BJTs, and relays.

12. The charge equalization apparatus according to claim 11, wherein the charge/discharge control switches and the redistribution switch are N-type MOSFETs.

13. The charge equalization apparatus according to claim 1, wherein the voltage detection and drive signal generation unit comprises:
a sensing unit for detecting voltages of the N batteries;
a microprocessor for setting ON/OFF times of the charge/discharge control switches and the redistribution switch depending on the voltages detected by the sensing unit; and
a switch driving circuit unit for generating the drive signal, required to drive both the charge/discharge control switches and the redistribution switch, in response to a signal input from the microprocessor.

14. A charge equalization apparatus, comprising:
N transformers, each having a single primary winding and two secondary windings, the N transformers being respectively connected in parallel with N series-connected batteries so as to charge batteries other than overcharged batteries with energy discharged from the overcharged batteries;
first and second charging devices connected in parallel with the N series-connected batteries;
first and second redistribution switches connected in parallel with the N series-connected batteries, and configured to supply a charge, supplied by the N series-connected batteries, to primary windings of the N transformers;
N charge/discharge control switching units connected between a common node of the first and second redistribution switches and first ends of the primary windings of the transformers so as to supply the charge, supplied by the N series-connected batteries, to the primary windings of the N transformers;
N first semiconductor switching devices respectively connected between first secondary windings of the N transformers and anodes of the batteries;
N second semiconductor switching devices respectively connected between second secondary windings of the N transformers and the anodes of the batteries; and
a voltage detection and drive signal generation unit configured to detect voltages of respective N series-connected batteries, to generate a drive signal, required to drive the charge/discharge control switching units and the redistribution switches, depending on detected voltages and to control driving of the charge/discharge control switching units and the redistribution switches.

15. The charge equalization apparatus according to claim 14, wherein, in each of the N transformers, a turns ratio of the primary winding to the secondary winding is N1:N2, and the first secondary winding and the second secondary winding have a same number of turns.

16. The charge equalization apparatus according to claim 15, wherein N1 is greater than N2.

17. The charge equalization apparatus according to claim 16, wherein the transformers are each implemented such that a dot formed on the primary winding and dots formed on the first and second secondary windings are placed on a same side.

18. The charge equalization apparatus according to claim 14, wherein the first semiconductor switching devices and the second semiconductor switching devices are one of MOSFETs, BJTs, relays, and diodes.

19. The charge equalization apparatus according to claim 18, wherein the first semiconductor switching devices and the second semiconductor switching devices are diodes.

20. The charge equalization apparatus according to claim 19, wherein the redistribution switches are one of MOSFETs, BJTs, and relays.

21. The charge equalization apparatus according to claim 14, wherein the voltage detection and drive signal generation unit comprises:
a sensing unit for detecting voltages of the N batteries;
a microprocessor for setting ON/OFF times of the charge/discharge control switches and the redistribution switches depending on the voltages detected by the sensing unit; and
a switch driving circuit unit for generating the drive signal, required to drive the charge/discharge control switches and the redistribution switches, in response to a signal input from the microprocessor.

* * * * *